(12) United States Patent
Rogers et al.

(10) Patent No.: US 10,569,204 B2
(45) Date of Patent: *Feb. 25, 2020

(54) FILTER MEDIUM AND BREATHER FILTER STRUCTURE

(71) Applicant: Donaldson Company, Inc., Minneapolis, MN (US)

(72) Inventors: Robert M. Rogers, Minnetonka, MN (US); Keh B. Dema, Johnson City, TN (US); Brad E. Kahlbaugh, Bloomington, MN (US); Linda M. Olson, Savage, MN (US); Chuanfang Yang, Eden Prairie, MN (US); Gregory L. LaVallee, Monticello, MN (US); Timothy D. Sporre, Brooklyn Park, MN (US); Joe Israel, St. Louis Park, MN (US); Paul L. Kojetin, Rosemount, MN (US); Derek O. Jones, Andover, MN (US); Michael A. Madden, Woodbury, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 88 days.

This patent is subject to a terminal disclaimer.

(21) Appl. No.: 15/434,290

(22) Filed: Feb. 16, 2017

(65) Prior Publication Data

US 2017/0225105 A1    Aug. 10, 2017

Related U.S. Application Data

(63) Continuation of application No. 14/134,604, filed on Dec. 19, 2013, now Pat. No. 9,795,906, which is a continuation of application No. 13/616,088, filed on Sep. 14, 2012, now Pat. No. 8,641,796, which is a continuation of application No. 13/591,669, filed on Aug. 22, 2012, now Pat. No. 8,512,435, which is a continuation of application No. 13/222,063, filed on Aug. 31, 2011, now Pat. No. 8,277,529, which is a continuation of application No. 13/110,148, filed on May 18, 2011, now Pat. No. 8,268,033, which is a continuation of application No. 11/381,010, filed on May 1, 2006, now Pat. No. 8,057,567, which is a continuation-in-part of application No. 11/267,958, filed on Nov. 4, 2005, now Pat. No. 7,314,497.

(60) Provisional application No. 60/650,051, filed on Feb. 4, 2005, provisional application No. 60/625,439, filed on Nov. 5, 2004.

(51) Int. Cl.
| | |
|---|---|
| *B01D 39/16* | (2006.01) |
| *B01D 39/20* | (2006.01) |
| *B01D 39/18* | (2006.01) |
| *B01D 46/00* | (2006.01) |
| *B01D 46/10* | (2006.01) |
| *B01D 46/24* | (2006.01) |
| *B01D 46/52* | (2006.01) |

(52) U.S. Cl.
CPC ....... *B01D 39/163* (2013.01); *B01D 39/1615* (2013.01); *B01D 39/18* (2013.01); *B01D 39/2017* (2013.01); *B01D 39/2024* (2013.01); *B01D 39/2037* (2013.01); *B01D 46/0068* (2013.01); *B01D 46/10* (2013.01); *B01D 46/2411* (2013.01); *B01D 46/521* (2013.01); *B01D 2239/0216* (2013.01); *B01D 2239/065* (2013.01); *B01D 2239/0668* (2013.01); *B01D 2275/10* (2013.01); *B01D 2279/60* (2013.01); *Y10T 442/616* (2015.04); *Y10T 442/622* (2015.04); *Y10T 442/623* (2015.04); *Y10T 442/637* (2015.04)

(58) Field of Classification Search
CPC .............. B01D 39/163; B01D 39/2013; B01D 39/2017; B01D 39/2024; B01D 2239/0216

See application file for complete search history.

(56) References Cited

U.S. PATENT DOCUMENTS

| | | |
|---|---|---|
| 431,108 A | 7/1890 | Cowley |
| 657,860 A | 9/1900 | Cummings |
| 2,764,602 A | 9/1956 | Ahlbrecht et al. |
| 2,764,603 A | 9/1956 | Ahlbrecht et al. |
| 2,801,706 A | 8/1957 | Asker |

(Continued)

FOREIGN PATENT DOCUMENTS

| | | |
|---|---|---|
| AU | 2005304879 | 5/2006 |
| CN | 1364095 | 8/2002 |

(Continued)

OTHER PUBLICATIONS

"PCT Written Opinion", from International Application No. PCT/US2005/039971 (WO2006052732), pp. 1-4.

Trautmann, P et al., "High Performance Nanofibre Coated Filter Media for Engine Intake Air Filtration", Filtration, vol. 6, No. 1, pp. 53-56 (2006) (9 pages).

Decision of the Opposition Division, Grounds for the Decision, & Annex to the Communication in EP2311542, dated Jan. 22, 2018, 29 pages.

(Continued)

*Primary Examiner* — Robert Clemente
(74) *Attorney, Agent, or Firm* — Mueting, Raasch & Gebhardt, P.A.

(57) ABSTRACT

Thermoplastic bicomponent binder fiber can be combined with other media, fibers and other filtration components to form a thermally bonded filtration media. The filtration media can be used in filter units, such as breather caps. Such filter units can be placed in the stream of a mobile fluid and can remove a particulate and/or fluid mist load from the mobile stream. The unique combination of media fiber, bicomponent binder fiber and other filtration additives and components provide a filtration media having unique properties in filtration applications.

10 Claims, No Drawings

(56) References Cited

U.S. PATENT DOCUMENTS

| | | |
|---|---|---|
| 2,803,656 A | 8/1957 | Ahlbrecht et al. |
| 3,019,127 A | 1/1962 | Czerwonka et al. |
| 3,073,735 A | 1/1963 | Till et al. |
| 3,147,064 A | 9/1964 | Brown et al. |
| 3,252,270 A | 5/1966 | Pall et al. |
| 3,255,131 A | 6/1966 | Ahlbrecht et al. |
| 3,279,151 A | 10/1966 | Kauer, Jr. et al. |
| 3,303,621 A | 2/1967 | Hill |
| 3,448,038 A | 6/1969 | Pall et al. |
| 3,450,755 A | 6/1969 | Ahlbrecht et al. |
| 3,505,794 A | 4/1970 | Nutter et al. |
| 3,589,956 A | 6/1971 | Krantz et al. |
| 3,595,731 A | 7/1971 | Davies et al. |
| 3,616,160 A | 10/1971 | Wincklhofer et al. |
| 3,616,183 A | 10/1971 | Brayford et al. |
| 3,620,819 A | 11/1971 | Croce |
| 3,639,195 A | 2/1972 | Sanders |
| 3,653,181 A | 4/1972 | Becker |
| 3,676,242 A | 7/1972 | Prentice |
| 3,705,480 A | 12/1972 | Wireman |
| 3,714,763 A | 2/1973 | Suzuki |
| 3,728,848 A | 4/1973 | Vest, Jr. |
| 3,744,256 A | 7/1973 | Cobb et al. |
| 3,826,067 A | 7/1974 | Wilder et al. |
| 3,841,953 A | 10/1974 | Lohkamp et al. |
| 3,849,241 A | 11/1974 | Butin et al. |
| 3,878,014 A | 4/1975 | Melead |
| 3,891,417 A | 6/1975 | Wade |
| 3,900,648 A | 8/1975 | Smith |
| 3,917,448 A | 11/1975 | Wood et al. |
| 3,934,238 A | 1/1976 | Pavlou |
| 3,937,860 A | 2/1976 | Gusman et al. |
| 3,971,373 A | 7/1976 | Braun |
| 3,972,694 A | 8/1976 | Head |
| 3,998,988 A | 12/1976 | Shimomai et al. |
| 4,042,522 A | 8/1977 | Falk |
| 4,045,350 A | 8/1977 | Kupf et al. |
| 4,047,914 A | 9/1977 | Hansen et al. |
| 4,069,158 A | 1/1978 | Bertocchio et al. |
| 4,069,244 A | 1/1978 | Mueller |
| 4,079,675 A | 3/1978 | Beumel, Jr. |
| 4,088,726 A | 5/1978 | Cumbers |
| 4,090,967 A | 5/1978 | Falk |
| 4,100,324 A | 7/1978 | Anderson et al. |
| 4,102,785 A | 7/1978 | Head et al. |
| 4,111,815 A | 9/1978 | Walker et al. |
| 4,160,059 A | 7/1979 | Samejima |
| 4,161,422 A | 7/1979 | Lawson et al. |
| 4,161,590 A | 7/1979 | Mueller |
| 4,161,602 A | 7/1979 | Mueller |
| 4,169,754 A | 10/1979 | Perrotta |
| 4,177,141 A | 12/1979 | Nakamura et al. |
| 4,189,338 A | 2/1980 | Ejima et al. |
| 4,196,027 A | 4/1980 | Walker et al. |
| 4,210,540 A | 7/1980 | Perrotta |
| 4,211,819 A | 7/1980 | Kunimune et al. |
| 4,227,904 A | 10/1980 | Kasmark, Jr. et al. |
| 4,231,768 A | 11/1980 | Seibert et al. |
| 4,234,655 A | 11/1980 | Kunimune et al. |
| 4,239,278 A | 12/1980 | Skilliter, Jr. |
| 4,239,516 A | 12/1980 | Klein |
| 4,254,731 A | 3/1981 | Taylor |
| 4,267,016 A | 5/1981 | Okazaki et al. |
| 4,269,888 A | 5/1981 | Ejima et al. |
| 4,272,318 A | 6/1981 | Walker et al. |
| 4,274,914 A | 6/1981 | Keith et al. |
| 4,309,475 A | 1/1982 | Hoffman, Jr. |
| 4,318,774 A | 3/1982 | Powell et al. |
| 4,321,108 A | 3/1982 | Goddard et al. |
| 4,327,936 A | 5/1982 | Sekiguchi |
| 4,370,152 A | 1/1983 | Luper |
| 4,388,086 A | 6/1983 | Bauer et al. |
| 4,423,995 A | 1/1984 | Karis |
| 4,429,001 A | 1/1984 | Kolpin et al. |
| 4,443,233 A | 4/1984 | Moran |
| 4,457,974 A | 7/1984 | Summers |
| 4,460,642 A | 7/1984 | Errede et al. |
| 4,487,617 A | 12/1984 | Dienes et al. |
| 4,500,384 A | 2/1985 | Tomioka et al. |
| 4,501,598 A | 2/1985 | Long |
| RE31,849 E | 3/1985 | Klein |
| 4,504,289 A | 3/1985 | Waller et al. |
| 4,516,994 A | 5/1985 | Kocher |
| 4,536,440 A | 8/1985 | Berg |
| 4,545,789 A | 10/1985 | Lata |
| 4,548,624 A | 10/1985 | Waller |
| 4,551,378 A | 11/1985 | Carey, Jr. |
| 4,552,603 A | 11/1985 | Harris, Jr. et al. |
| 4,555,430 A | 11/1985 | Mays |
| 4,579,774 A | 4/1986 | Kuwazuru et al. |
| 4,597,218 A | 7/1986 | Friemel et al. |
| 4,604,205 A | 8/1986 | Ayers |
| 4,610,678 A | 9/1986 | Weisman et al. |
| 4,627,863 A | 12/1986 | Klein |
| 4,650,506 A | 3/1987 | Barris et al. |
| 4,657,804 A | 4/1987 | Mays et al. |
| 4,659,467 A | 4/1987 | Spearman |
| 4,661,132 A | 4/1987 | Thornton et al. |
| 4,676,807 A | 6/1987 | Miller et al. |
| 4,677,929 A | 7/1987 | Harris |
| 4,681,801 A | 7/1987 | Eian et al. |
| 4,684,576 A | 8/1987 | Tabor et al. |
| 4,688,511 A | 8/1987 | Gerlach et al. |
| 4,689,057 A | 8/1987 | Gasper |
| 4,713,285 A | 12/1987 | Klein |
| 4,726,817 A | 2/1988 | Roger |
| 4,729,371 A | 3/1988 | Krueger et al. |
| 4,732,809 A | 3/1988 | Harris, Jr. et al. |
| 4,734,208 A | 3/1988 | Pall et al. |
| 4,753,730 A | 6/1988 | Maurer |
| 4,759,782 A | 7/1988 | Miller et al. |
| 4,764,189 A | 8/1988 | Yanagawa et al. |
| 4,765,812 A | 8/1988 | Homonoff et al. |
| 4,765,915 A | 8/1988 | Diehl |
| 4,807,619 A | 2/1989 | Dyrud et al. |
| 4,814,033 A | 3/1989 | Spearman et al. |
| 4,816,224 A | 3/1989 | Vogel et al. |
| 4,836,931 A | 6/1989 | Spearman et al. |
| 4,838,903 A | 6/1989 | Thomaides et al. |
| 4,838,905 A | 6/1989 | Billiet et al. |
| 4,840,838 A | 6/1989 | Wyss |
| 4,868,032 A | 9/1989 | Eian et al. |
| 4,874,666 A | 10/1989 | Kubo et al. |
| 4,886,058 A | 12/1989 | Brostrom et al. |
| 4,889,764 A | 12/1989 | Chenoweth et al. |
| 4,904,385 A | 2/1990 | Wessling et al. |
| 4,910,064 A | 3/1990 | Sabee |
| 4,911,789 A | 3/1990 | Rieunier et al. |
| 4,917,714 A | 4/1990 | Kinsley, Jr. |
| 4,919,753 A | 4/1990 | Johnson et al. |
| 4,933,129 A | 6/1990 | Huykman |
| 4,983,434 A | 1/1991 | Sassa |
| 5,022,964 A | 6/1991 | Crane et al. |
| 5,027,781 A | 7/1991 | Lewis |
| 5,034,040 A | 7/1991 | Walcott et al. |
| 5,042,468 A | 8/1991 | Lambert |
| 5,045,210 A | 9/1991 | Chen et al. |
| 5,057,368 A | 10/1991 | Largman et al. |
| 5,066,538 A | 11/1991 | Huykman |
| 5,068,141 A | 11/1991 | Kubo et al. |
| 5,080,791 A | 1/1992 | Sims |
| 5,082,476 A | 1/1992 | Kahlbaugh et al. |
| 5,087,278 A | 2/1992 | Suzuki |
| 5,089,119 A | 2/1992 | Day et al. |
| 5,092,911 A | 3/1992 | Williams et al. |
| 5,104,537 A | 4/1992 | Stifelman et al. |
| 5,108,827 A | 4/1992 | Gessner |
| 5,110,330 A | 5/1992 | Loughran |
| 5,131,387 A | 7/1992 | French et al. |
| 5,135,792 A | 8/1992 | Hogan |
| 5,147,553 A | 9/1992 | Waite |
| 5,147,721 A | 9/1992 | Baron et al. |
| 5,160,582 A | 11/1992 | Takahashi |
| 5,167,764 A | 12/1992 | Nielsen et al. |

(56) References Cited

U.S. PATENT DOCUMENTS

| | | |
|---|---|---|
| 5,167,765 A | 12/1992 | Nielsen et al. |
| 5,190,569 A | 3/1993 | McGrath |
| 5,190,812 A | 3/1993 | Joseph et al. |
| 5,208,098 A | 5/1993 | Stover |
| 5,212,131 A | 5/1993 | Belding |
| 5,238,474 A | 8/1993 | Kahlbaugh et al. |
| 5,246,474 A | 9/1993 | Greatorex |
| 5,246,772 A | 9/1993 | Manning |
| 5,275,743 A | 1/1994 | Miller et al. |
| 5,283,106 A | 2/1994 | Seiler et al. |
| 5,284,704 A | 2/1994 | Kochesky et al. |
| 5,284,997 A | 2/1994 | Spearman et al. |
| 5,286,802 A | 2/1994 | Uesugi et al. |
| 5,302,443 A | 4/1994 | Manning et al. |
| 5,307,796 A | 5/1994 | Kronzer et al. |
| 5,328,758 A | 7/1994 | Markell et al. |
| 5,332,426 A | 7/1994 | Tang et al. |
| 5,334,446 A | 8/1994 | Quantrille et al. |
| 5,336,286 A | 8/1994 | Alexander et al. |
| 5,342,418 A | 8/1994 | Jesse |
| 5,344,698 A | 9/1994 | Rock et al. |
| 5,354,603 A | 10/1994 | Erede et al. |
| 5,364,456 A | 11/1994 | Kahlbaugh et al. |
| 5,366,631 A | 11/1994 | Adiletta |
| 5,380,580 A | 1/1995 | Rogers et al. |
| 5,405,682 A | 4/1995 | Shawyer et al. |
| 5,415,676 A | 5/1995 | Tokar et al. |
| 5,423,892 A | 6/1995 | Kahlbaugh et al. |
| 5,436,980 A | 7/1995 | Weeks et al. |
| 5,454,945 A | 10/1995 | Spearman |
| 5,456,982 A | 10/1995 | Hansen et al. |
| 5,458,960 A | 10/1995 | Nieminen et al. |
| 5,468,572 A | 11/1995 | Zguris et al. |
| 5,472,467 A | 12/1995 | Pfeffer |
| 5,478,466 A | 12/1995 | Heilmann et al. |
| 5,486,410 A | 1/1996 | Groeger et al. |
| 5,508,079 A | 4/1996 | Grant et al. |
| 5,508,093 A | 4/1996 | Mehdorn |
| 5,509,340 A | 4/1996 | Kawamura |
| 5,545,453 A | 8/1996 | Grant |
| 5,545,475 A | 8/1996 | Korleski |
| 5,565,062 A | 10/1996 | Nass et al. |
| 5,575,832 A | 11/1996 | Boyd |
| 5,580,459 A | 12/1996 | Powers et al. |
| 5,581,647 A | 12/1996 | Onishi et al. |
| 5,584,784 A | 12/1996 | Wu |
| 5,597,654 A | 1/1997 | Scholz et al. |
| 5,603,747 A | 2/1997 | Matuda et al. |
| 5,605,746 A | 2/1997 | Groeger et al. |
| 5,607,490 A | 3/1997 | Taniguchi et al. |
| 5,607,735 A | 3/1997 | Brown |
| 5,614,283 A | 3/1997 | Potnis et al. |
| 5,616,408 A | 4/1997 | Oleszczuk et al. |
| 5,620,641 A | 4/1997 | Berger |
| 5,620,785 A | 4/1997 | Watt et al. |
| 5,633,082 A | 5/1997 | Berger |
| 5,638,569 A | 6/1997 | Newell |
| 5,643,467 A | 7/1997 | Romanco |
| 5,643,653 A | 7/1997 | Griesbach, III et al. |
| 5,645,057 A | 7/1997 | Watt et al. |
| 5,645,689 A | 7/1997 | Ruf et al. |
| 5,645,690 A | 7/1997 | Cox, Jr. |
| 5,652,048 A | 7/1997 | Haynes et al. |
| 5,662,728 A | 9/1997 | Groeger |
| 5,665,235 A | 9/1997 | Gildersleeve et al. |
| 5,667,562 A | 9/1997 | Midkiff |
| 5,669,949 A | 9/1997 | Dudrey et al. |
| 5,672,399 A | 9/1997 | Kahlbaugh et al. |
| 5,672,415 A | 9/1997 | Sawyer et al. |
| 5,677,058 A | 10/1997 | Neal et al. |
| 5,679,042 A | 10/1997 | Varona |
| 5,681,469 A | 10/1997 | Barboza |
| 5,705,119 A | 1/1998 | Takeuchi et al. |
| 5,709,735 A | 1/1998 | Midkiff et al. |
| 5,711,878 A | 1/1998 | Ogata et al. |
| 5,721,180 A | 2/1998 | Pike et al. |
| 5,728,187 A | 3/1998 | Kern et al. |
| 5,728,298 A | 3/1998 | Hamlin |
| 5,753,002 A | 5/1998 | Glucksman |
| 5,755,963 A | 5/1998 | Sugiura et al. |
| 5,779,847 A | 7/1998 | Groeger |
| 5,783,505 A | 7/1998 | Duckett et al. |
| 5,785,725 A | 7/1998 | Cusick et al. |
| 5,792,711 A | 8/1998 | Roberts |
| 5,795,835 A | 8/1998 | Bruner et al. |
| 5,800,586 A | 9/1998 | Cusick et al. |
| 5,800,587 A | 9/1998 | Kahlbaugh |
| 5,800,884 A | 9/1998 | D'Anna et al. |
| 5,804,286 A | 9/1998 | Quantrille et al. |
| 5,820,646 A | 10/1998 | Gillingham et al. |
| 5,837,018 A | 11/1998 | Goerg |
| 5,837,627 A | 11/1998 | Halabisky et al. |
| 5,840,245 A | 11/1998 | Coombs et al. |
| 5,853,439 A | 12/1998 | Gieseke et al. |
| 5,883,439 A | 3/1999 | Saitoh |
| 5,885,390 A | 3/1999 | Alkire et al. |
| 5,885,696 A | 3/1999 | Groeger |
| 5,911,213 A | 6/1999 | Ahlborn et al. |
| 5,932,104 A | 8/1999 | Kawamura |
| 5,935,879 A | 8/1999 | Helwig et al. |
| 5,935,883 A | 8/1999 | Pike |
| 5,948,344 A | 9/1999 | Cusick et al. |
| 5,952,092 A | 9/1999 | Groeger et al. |
| 5,952,252 A | 9/1999 | Shawver et al. |
| 5,954,962 A | 9/1999 | Adiletta |
| 5,965,091 A | 10/1999 | Navarre et al. |
| 5,965,468 A | 10/1999 | Marmon et al. |
| 5,972,166 A | 10/1999 | Helwig et al. |
| 5,972,477 A | 10/1999 | Kim et al. |
| 5,972,808 A | 10/1999 | Groeger et al. |
| 5,976,998 A | 11/1999 | Sandor et al. |
| 5,981,410 A | 11/1999 | Hansen et al. |
| 5,989,432 A | 11/1999 | Gildersleeve et al. |
| 5,989,688 A | 11/1999 | Barge et al. |
| 5,993,501 A | 11/1999 | Cusick et al. |
| 5,993,905 A | 11/1999 | Sheehan |
| 5,993,943 A | 11/1999 | Bodaghi et al. |
| 6,007,608 A | 12/1999 | Johnson |
| 6,007,898 A | 12/1999 | Kim et al. |
| 6,013,587 A | 1/2000 | Truong et al. |
| 6,041,782 A | 3/2000 | Angadjivand et al. |
| 6,045,597 A | 4/2000 | Choie |
| 6,048,379 A | 4/2000 | Bray et al. |
| 6,071,419 A | 6/2000 | Beier et al. |
| 6,071,641 A | 6/2000 | Zguris |
| 6,077,391 A | 6/2000 | Girondi |
| 6,099,726 A | 8/2000 | Gembolis et al. |
| 6,103,181 A | 8/2000 | Berger |
| 6,103,643 A | 8/2000 | Forsten |
| 6,110,249 A | 8/2000 | Medcalf et al. |
| 6,114,262 A | 9/2000 | Groh et al. |
| 6,136,058 A | 10/2000 | Miller |
| 6,139,595 A | 10/2000 | Herman et al. |
| 6,143,049 A | 11/2000 | Gieseke et al. |
| 6,143,441 A | 11/2000 | Zguris et al. |
| 6,146,436 A | 11/2000 | Hollingsworth et al. |
| 6,152,120 A | 11/2000 | Julazadeh |
| 6,024,782 A | 12/2000 | Freund |
| 6,156,682 A | 12/2000 | Fletemier et al. |
| 6,156,842 A | 12/2000 | Hoenig et al. |
| 6,165,572 A | 12/2000 | Kahlbaugh et al. |
| 6,169,045 B1 | 1/2001 | Pike et al. |
| 6,171,355 B1 | 1/2001 | Gieseke et al. |
| 6,171,369 B1 | 1/2001 | Schultink et al. |
| 6,171,684 B1 | 1/2001 | Kahlbaugh et al. |
| 6,174,603 B1 | 1/2001 | Berger |
| 6,183,536 B1 | 2/2001 | Schultink et al. |
| 6,186,992 B1 | 2/2001 | Roe et al. |
| 6,187,073 B1 | 2/2001 | Gieseke et al. |
| 6,190,768 B1 | 2/2001 | Turley et al. |
| 6,197,709 B1 | 3/2001 | Tsai et al. |
| 6,200,669 B1 | 3/2001 | Marmon et al. |
| 6,203,713 B1 | 3/2001 | Tanny |
| 6,241,886 B1 | 6/2001 | Kitagawa et al. |

(56) References Cited

U.S. PATENT DOCUMENTS

| | | |
|---|---|---|
| 6,251,224 B1 | 6/2001 | Dong |
| 6,264,044 B1 | 7/2001 | Meyering |
| 6,267,252 B1 | 7/2001 | Amsler |
| 6,267,843 B1 | 7/2001 | Helwig et al. |
| 6,290,739 B1 | 9/2001 | Gieseke et al. |
| 6,300,261 B1 | 10/2001 | Young et al. |
| 6,301,887 B1 | 10/2001 | Gorel et al. |
| 6,306,539 B1 | 10/2001 | Zguris |
| 6,316,107 B1 | 11/2001 | Lubnin et al. |
| 6,322,604 B1 | 11/2001 | Midkiff |
| 6,330,883 B1 | 12/2001 | Berger |
| 6,351,078 B1 | 2/2002 | Wang et al. |
| 6,352,947 B1 | 3/2002 | Haley et al. |
| 6,355,076 B2 | 3/2002 | Gieseke et al. |
| 6,355,079 B1 | 3/2002 | Sorvari et al. |
| 6,364,976 B2 | 4/2002 | Fletemier et al. |
| 6,365,001 B1 | 4/2002 | Helwig et al. |
| 6,371,977 B1 | 4/2002 | Bumbarger et al. |
| 6,372,004 B1 | 4/2002 | Schultink et al. |
| 6,384,369 B1 | 5/2002 | Stenersen et al. |
| 6,395,153 B1 | 5/2002 | Matousek et al. |
| 6,406,789 B1 | 6/2002 | McDaniel et al. |
| 6,409,785 B1 | 6/2002 | Smithies et al. |
| 6,409,787 B1 | 6/2002 | Smithies et al. |
| 6,419,721 B1 | 7/2002 | Hunter |
| 6,419,839 B1 | 7/2002 | Cox et al. |
| 6,420,626 B1 | 7/2002 | Erspamer et al. |
| 6,428,610 B1 | 8/2002 | Tsai et al. |
| 6,440,192 B2 | 8/2002 | Guerin et al. |
| 6,458,456 B1 | 10/2002 | Zainiev et al. |
| 6,471,740 B2 | 10/2002 | Kobayashi et al. |
| 6,478,953 B2 | 11/2002 | Spearman et al. |
| 6,479,147 B2 | 11/2002 | Lubnin et al. |
| 6,488,811 B1 | 12/2002 | Dong |
| 6,492,183 B1 | 12/2002 | Perman et al. |
| 6,495,286 B2 | 12/2002 | Zguris et al. |
| 6,495,656 B1 | 12/2002 | Haile et al. |
| 6,497,950 B1 | 12/2002 | Haile et al. |
| 6,503,447 B1 | 1/2003 | Mondjian et al. |
| 6,511,774 B1 | 1/2003 | Tsukuda et al. |
| 6,514,306 B1 | 2/2003 | Rohrbach et al. |
| 6,517,612 B1 | 2/2003 | Crouch et al. |
| 6,517,725 B2 | 2/2003 | Spearman et al. |
| 6,521,012 B2 | 2/2003 | Lamon et al. |
| 6,521,321 B2 | 2/2003 | Kahlbaugh et al. |
| 6,528,439 B1 | 3/2003 | Stokes et al. |
| 6,530,366 B2 | 3/2003 | Geiger et al. |
| 6,530,969 B2 | 3/2003 | Gieseke et al. |
| 6,540,801 B2 | 4/2003 | Gieseke et al. |
| 6,541,114 B2 | 4/2003 | Katou et al. |
| 6,547,860 B2 | 4/2003 | Buchwald et al. |
| 6,551,608 B2 | 4/2003 | Yao |
| 6,555,489 B1 | 4/2003 | Pfeffer |
| 6,576,034 B2 | 6/2003 | Berger |
| 6,579,342 B2 | 6/2003 | Wang et al. |
| 6,585,808 B2 | 7/2003 | Burban et al. |
| 6,588,641 B2 | 7/2003 | Pritie |
| 6,602,311 B2 | 8/2003 | Berger |
| 6,607,997 B1 | 8/2003 | Cox et al. |
| 6,613,704 B1 | 9/2003 | Arnold et al. |
| 6,616,723 B2 | 9/2003 | Berger |
| 6,624,099 B1 | 9/2003 | Shah |
| 6,627,252 B1 | 9/2003 | Nanjundiah et al. |
| H2086 H | 10/2003 | Amsler |
| 6,645,388 B2 | 11/2003 | Sheikh-Ali |
| 6,646,179 B1 | 11/2003 | Melius et al. |
| 6,649,547 B1 | 11/2003 | Arnold et al. |
| 6,652,614 B2 | 11/2003 | Gieseke et al. |
| 6,653,381 B2 | 11/2003 | Thames et al. |
| 6,673,864 B2 | 1/2004 | Patel et al. |
| 6,682,576 B1 | 1/2004 | Kiyotani et al. |
| 6,682,809 B2 | 1/2004 | Van Rheenen |
| 6,695,148 B2 | 2/2004 | Homonoff et al. |
| 6,705,270 B1 | 3/2004 | Rau et al. |
| 6,706,086 B2 | 3/2004 | Emig et al. |
| 6,723,142 B2 | 4/2004 | Emerson et al. |
| 6,723,149 B2 | 4/2004 | Ernst et al. |
| 6,723,669 B1 | 4/2004 | Clark et al. |
| 6,726,751 B2 | 4/2004 | Sause et al. |
| 6,740,142 B2 | 5/2004 | Buettner et al. |
| 6,743,273 B2 | 6/2004 | Chung et al. |
| 6,758,873 B2 | 7/2004 | Gieseke et al. |
| 6,770,356 B2 | 8/2004 | O'Donnell et al. |
| 6,792,925 B2 | 9/2004 | Dworatzek et al. |
| 6,797,377 B1 | 9/2004 | Delucia et al. |
| 6,815,383 B1 | 11/2004 | Arnold |
| 6,818,037 B2 | 11/2004 | Tanaka et al. |
| 6,821,321 B2 | 11/2004 | Chinn et al. |
| 6,821,672 B2 | 11/2004 | Zguris |
| 6,830,656 B2 | 12/2004 | Kinsley, Jr. |
| 6,835,311 B2 | 12/2004 | Koslow |
| 6,848,866 B1 | 2/2005 | McGinn |
| 6,849,330 B1 | 2/2005 | Morin et al. |
| 6,852,148 B2 | 2/2005 | Gieseke et al. |
| 6,858,057 B2 | 2/2005 | Healey |
| 6,860,917 B2 | 3/2005 | Henrichsen et al. |
| 6,866,692 B2 | 3/2005 | Emerson et al. |
| 6,872,431 B2 | 3/2005 | Kahlbaugh et al. |
| 6,872,674 B2 | 3/2005 | Williams et al. |
| 6,874,641 B2 | 4/2005 | Clary |
| 6,875,249 B2 | 4/2005 | Gogins |
| 6,878,191 B2 | 4/2005 | Escaffre et al. |
| 6,878,193 B2 | 4/2005 | Kasmark, Jr. |
| 6,883,321 B2 | 4/2005 | Fornof |
| 6,900,148 B2 | 5/2005 | Yoneda et al. |
| 6,916,752 B2 | 7/2005 | Berrigan et al. |
| 6,918,939 B2 | 7/2005 | Dworatzek et al. |
| 6,923,182 B2 | 8/2005 | Angadjivand et al. |
| 6,924,028 B2 | 8/2005 | Chung et al. |
| 6,926,961 B2 | 8/2005 | Roth |
| 6,936,554 B1 | 8/2005 | Singer |
| 6,939,386 B2 | 9/2005 | Sato et al. |
| 6,939,492 B2 | 9/2005 | Jackson et al. |
| 6,942,711 B2 | 9/2005 | Faulkner et al. |
| 6,955,708 B1 | 10/2005 | Julos et al. |
| 6,955,775 B2 | 10/2005 | Chung et al. |
| 6,962,615 B2 | 11/2005 | Staudenmayer et al. |
| 6,966,940 B2 | 11/2005 | Krisko et al. |
| 6,991,113 B2 | 1/2006 | Nakajima |
| 6,997,208 B2 | 2/2006 | Mack |
| 7,008,144 B2 | 3/2006 | McGinn |
| 7,008,465 B2 | 3/2006 | Graham et al. |
| 7,011,011 B2 | 3/2006 | Jessberger et al. |
| 7,017,563 B2 | 3/2006 | Dworatzed et al. |
| 7,029,516 B2 | 4/2006 | Campbell et al. |
| 7,033,410 B2 | 4/2006 | Hilpert et al. |
| 7,033,493 B2 | 4/2006 | McGarvey et al. |
| 7,037,569 B2 | 5/2006 | Curro et al. |
| 7,049,254 B2 | 5/2006 | Bansal et al. |
| 7,070,640 B2 | 7/2006 | Chung et al. |
| 7,081,145 B2 | 7/2006 | Gieseke et al. |
| 7,090,715 B2 | 8/2006 | Chung et al. |
| 7,094,270 B2 | 8/2006 | Schultink et al. |
| 7,115,150 B2 | 10/2006 | Johnson et al. |
| 7,125,470 B2 | 10/2006 | Graef et al. |
| 7,163,349 B2 | 1/2007 | Policicchio et al. |
| 7,174,612 B2 | 2/2007 | Ortega et al. |
| 7,182,537 B2 | 2/2007 | Policicchio et al. |
| 7,182,804 B2 | 2/2007 | Gieseke et al. |
| 7,267,789 B2 | 9/2007 | Chhabra et al. |
| 7,278,542 B2 | 10/2007 | Dussaud et al. |
| 7,288,338 B2 | 10/2007 | Zguris |
| 7,309,372 B2 | 12/2007 | Kahlbaugh et al. |
| 7,314,497 B2 | 1/2008 | Kahlbaugh et al. |
| 7,329,623 B2 | 2/2008 | Kinn et al. |
| 7,520,994 B2 | 4/2009 | Dong et al. |
| 7,717,975 B2 | 5/2010 | Kalayci et al. |
| 7,737,224 B2 | 6/2010 | Willis et al. |
| 7,772,456 B2 | 8/2010 | Zhang et al. |
| 7,896,941 B2 | 3/2011 | Choi |
| 7,918,913 B2 | 4/2011 | Kalayci et al. |
| 7,985,344 B2 | 7/2011 | Dema et al. |
| 8,021,455 B2 | 9/2011 | Adamek et al. |
| 8,021,457 B2 | 9/2011 | Dema et al. |

(56) References Cited

U.S. PATENT DOCUMENTS

| | | |
|---|---|---|
| 8,021,547 B2 | 9/2011 | Hukki |
| 8,057,567 B2 | 11/2011 | Webb et al. |
| 8,096,290 B2 | 1/2012 | Karlsson |
| 8,177,875 B2 | 5/2012 | Rogers et al. |
| 8,267,681 B2 | 9/2012 | Hemant et al. |
| 8,268,033 B2 | 9/2012 | Rogers et al. |
| 8,277,529 B2 | 10/2012 | Rogers et al. |
| 8,404,014 B2 | 3/2013 | Israel et al. |
| 8,460,424 B2 | 6/2013 | Rogers et al. |
| 8,512,435 B2 | 8/2013 | Rogers et al. |
| 8,641,796 B2 | 2/2014 | Rogers et al. |
| 9,795,906 B2 | 10/2017 | Rogers et al. |
| 9,885,154 B2 | 2/2018 | Gupta et al. |
| 2001/0000375 A1 | 4/2001 | Kobayashi et al. |
| 2001/0033932 A1 | 10/2001 | Katou et al. |
| 2002/0007167 A1 | 1/2002 | Dan et al. |
| 2002/0013111 A1 | 1/2002 | Dugan et al. |
| 2002/0016120 A1 | 2/2002 | Nagano et al. |
| 2002/0083690 A1 | 7/2002 | Emig et al. |
| 2002/0092423 A1 | 7/2002 | Gillingham et al. |
| 2002/0106478 A1 | 8/2002 | Hayase et al. |
| 2002/0116910 A1 | 8/2002 | Berger |
| 2002/0121194 A1 | 9/2002 | Buchwald et al. |
| 2002/0127939 A1 | 9/2002 | Hwo et al. |
| 2002/0148776 A1 | 10/2002 | Cousart et al. |
| 2002/0148876 A1 | 10/2002 | Pritie |
| 2002/0193030 A1 | 12/2002 | Yao |
| 2003/0008214 A1 | 1/2003 | Zguris |
| 2003/0019193 A1 | 1/2003 | Chinn et al. |
| 2003/0022575 A1 | 1/2003 | Yoneda et al. |
| 2003/0039815 A1 | 2/2003 | Roth |
| 2003/0082979 A1 | 5/2003 | Bean et al. |
| 2003/0084788 A1 | 5/2003 | Fraser, Jr. |
| 2003/0087568 A1 | 5/2003 | Kinn et al. |
| 2003/0089092 A1 | 5/2003 | Sause et al. |
| 2003/0096549 A1 | 5/2003 | Ortega et al. |
| 2003/0099576 A1 | 5/2003 | Li et al. |
| 2003/0106294 A1 | 6/2003 | Chung et al. |
| 2003/0109190 A1 | 6/2003 | Geel |
| 2003/0139110 A1 | 7/2003 | Nagaoka et al. |
| 2003/0145569 A1 | 8/2003 | Sato et al. |
| 2003/0148691 A1 | 8/2003 | Pelham, Sr. et al. |
| 2003/0150820 A1 | 8/2003 | Dussaud et al. |
| 2003/0211069 A1 | 11/2003 | Deckner et al. |
| 2003/0211799 A1 | 11/2003 | Yao et al. |
| 2004/0038014 A1 | 2/2004 | Schaefer et al. |
| 2004/0116026 A1 | 6/2004 | Kubose et al. |
| 2004/0134355 A1 | 7/2004 | Kasmark et al. |
| 2004/0192141 A1 | 9/2004 | Yang et al. |
| 2004/0211400 A1 | 10/2004 | Basset |
| 2004/0221436 A1 | 11/2004 | Ortega et al. |
| 2004/0242108 A1 | 12/2004 | Russell et al. |
| 2004/0255783 A1 | 12/2004 | Graham et al. |
| 2005/0000876 A1 | 1/2005 | Knight |
| 2005/0026526 A1 | 2/2005 | Verdegan et al. |
| 2005/0109683 A1 | 5/2005 | Joyce et al. |
| 2005/0130031 A1 | 6/2005 | Zguris |
| 2005/0160711 A1* | 7/2005 | Yang .............. B01D 39/1623 55/524 |
| 2005/0210844 A1 | 9/2005 | Kahlbaugh et al. |
| 2005/0211232 A1 | 9/2005 | Dushek et al. |
| 2005/0214188 A1 | 9/2005 | Rohrbach et al. |
| 2005/0215965 A1 | 9/2005 | Schmidt et al. |
| 2005/0233665 A1 | 10/2005 | Groten et al. |
| 2006/0009106 A1 | 1/2006 | Nishimura et al. |
| 2006/0086344 A1 | 4/2006 | Karlsson |
| 2006/0094320 A1 | 5/2006 | Chen et al. |
| 2006/0096263 A1 | 5/2006 | Kahlbaugh et al. |
| 2006/0096932 A1 | 5/2006 | Dema et al. |
| 2006/0101796 A1 | 5/2006 | Kern et al. |
| 2006/0121811 A1 | 6/2006 | Mangold et al. |
| 2006/0137317 A1 | 6/2006 | Bryner et al. |
| 2006/0207932 A1 | 9/2006 | Hajek et al. |
| 2006/0230731 A1 | 10/2006 | Kalayei et al. |
| 2006/0242933 A1 | 11/2006 | Webb et al. |
| 2006/0246798 A1 | 11/2006 | Reneker et al. |
| 2006/0266701 A1 | 11/2006 | Dickerson et al. |
| 2007/0039300 A1 | 2/2007 | Kahlbaugh et al. |
| 2007/0062855 A1 | 3/2007 | Chase et al. |
| 2007/0210008 A1 | 9/2007 | Sprenger et al. |
| 2007/0227359 A1 | 10/2007 | Choi |
| 2008/0035103 A1 | 2/2008 | Barris et al. |
| 2008/0073296 A1 | 3/2008 | Dema et al. |
| 2008/0245037 A1 | 10/2008 | Rogers et al. |
| 2009/0044702 A1 | 2/2009 | Adamek et al. |
| 2009/0050578 A1 | 2/2009 | Israel et al. |
| 2009/0266759 A1 | 10/2009 | Green et al. |
| 2010/0187171 A1 | 7/2010 | Gupta |
| 2010/0187712 A1 | 7/2010 | Gupta et al. |
| 2011/0154790 A1 | 6/2011 | Israel et al. |
| 2011/0215046 A1 | 9/2011 | Rogers et al. |
| 2011/0309012 A1 | 12/2011 | Rogers |
| 2012/0210689 A1 | 8/2012 | Rogers et al. |
| 2012/0312738 A1 | 12/2012 | Rogers et al. |
| 2013/0008846 A1 | 1/2013 | Rogers et al. |
| 2014/0197094 A1 | 7/2014 | Rogers et al. |
| 2017/0225105 A1 | 8/2017 | Rogers et al. |

FOREIGN PATENT DOCUMENTS

| | | |
|---|---|---|
| CN | 1543520 A | 11/2004 |
| CN | 101098741 | 1/2008 |
| CN | 101934172 | 1/2011 |
| CN | 101947400 | 1/2011 |
| DE | 4344819 | 7/1994 |
| DE | 202005020566 | 5/2005 |
| EP | 0451554 | 10/1991 |
| EP | 0465203 | 1/1992 |
| EP | 0904819 | 3/1999 |
| EP | 1036585 | 9/2000 |
| EP | 0844861 | 3/2002 |
| EP | 1179673 | 12/2002 |
| EP | 1171495 | 3/2003 |
| EP | 1118632 | 4/2005 |
| EP | 1141454 | 3/2006 |
| EP | 1378283 | 4/2007 |
| EP | 1827649 B1 | 9/2007 |
| EP | 1894609 | 3/2008 |
| EP | 1938883 A1 | 7/2008 |
| EP | 2308579 B1 | 4/2011 |
| EP | 2311542 B1 | 4/2011 |
| EP | 2311543 B1 | 4/2011 |
| EP | 1 827 649 B1 | 2/2013 |
| EP | 2 311 542 B1 | 6/2015 |
| EP | 2 311 543 B1 | 7/2015 |
| EP | 2 308 579 B1 | 1/2016 |
| EP | 3138621 A1 | 3/2017 |
| GB | 1532076 | 11/1978 |
| JP | 55117615 | 9/1980 |
| JP | 57099716 | 6/1982 |
| JP | 58205520 | 11/1983 |
| JP | 60025521 | 2/1985 |
| JP | 62-079822 | 4/1987 |
| JP | 63126955 | 5/1988 |
| JP | 64-014399 | 1/1989 |
| JP | H03270703 | 12/1991 |
| JP | 06-218210 | 8/1994 |
| JP | 06233909 | 8/1994 |
| JP | H06-218210 A | 8/1994 |
| JP | 7265640 | 10/1995 |
| JP | 08196829 | 8/1996 |
| JP | 08206421 | 8/1996 |
| JP | H08-323121 A | 12/1996 |
| JP | 09000841 | 1/1997 |
| JP | H09-095893 A | 4/1997 |
| JP | H09-192423 | 7/1997 |
| JP | 10046486 | 2/1998 |
| JP | 10156116 | 6/1998 |
| JP | 10161962 | 6/1998 |
| JP | 10165731 A | 6/1998 |
| JP | H11-309315 | 11/1999 |
| JP | 2000-202235 A | 7/2000 |
| JP | 2000-246097 A | 9/2000 |
| JP | 2002-046201 A | 2/2002 |

(56) References Cited

FOREIGN PATENT DOCUMENTS

| | | |
|---|---|---|
| JP | 2002085918 | 3/2002 |
| JP | 2002177718 | 6/2002 |
| JP | 2003290617 A | 10/2003 |
| JP | 2003325411 | 11/2003 |
| JP | 2004002176 | 1/2004 |
| JP | 2004017041 A | 1/2004 |
| JP | 2004-066737 A | 3/2004 |
| JP | 2004160328 | 6/2004 |
| JP | 2004160361 | 6/2004 |
| JP | 2004188355 | 7/2004 |
| JP | 2004255230 | 9/2004 |
| JP | 2004305853 | 11/2004 |
| JP | 2006512530 | 4/2006 |
| JP | 2008518770 A | 6/2008 |
| JP | 2008518772 A | 6/2008 |
| JP | 5340598 B2 | 11/2013 |
| KP | 10165731 | 6/1998 |
| KR | 19950011179 | 9/1995 |
| KR | 19990030043 | 4/1999 |
| RU | 2389529 | 5/2010 |
| WO | WO 1989/003716 | 1/1989 |
| WO | WO 1993010881 | 6/1993 |
| WO | WO 1994005396 | 3/1994 |
| WO | WO 9513856 | 5/1995 |
| WO | WO 1997041167 | 11/1997 |
| WO | WO 199748846 | 12/1997 |
| WO | WO 1999047211 | 9/1999 |
| WO | WO 2000032295 | 6/2000 |
| WO | WO 2000059969 | 10/2000 |
| WO | WO 2001003802 | 1/2001 |
| WO | WO 0107143 | 2/2001 |
| WO | WO 200110929 | 2/2001 |
| WO | WO 2001041898 | 6/2001 |
| WO | WO 0147618 | 7/2001 |
| WO | WO 0185824 | 11/2001 |
| WO | WO 2001085824 | 11/2001 |
| WO | WO 0245098 | 6/2002 |
| WO | WO 2003013732 | 2/2003 |
| WO | WO 2003080904 | 10/2003 |
| WO | WO 2003080905 | 10/2003 |
| WO | WO 2003013732 | 1/2004 |
| WO | WO 2004089509 | 10/2004 |
| WO | WO 2005005696 | 1/2005 |
| WO | WO 2005005704 | 1/2005 |
| WO | WO 2005075054 | 8/2005 |
| WO | WO 2005082488 | 9/2005 |
| WO | WO 2005083240 | 9/2005 |
| WO | WO 2005120678 | 12/2005 |
| WO | WO 2006052656 | 5/2006 |
| WO | WO 2006052732 | 5/2006 |
| WO | WO 2006089063 | 8/2006 |
| WO | WO 2007133403 A2 | 11/2007 |
| WO | WO 2007133403 A3 | 1/2008 |
| WO | WO 2008103821 A2 | 8/2008 |
| WO | WO 2008103821 A3 | 10/2008 |
| WO | WO 2009088647 | 7/2009 |

OTHER PUBLICATIONS

Preparation for Oral Proceedings & Annex in EP2308579, dated Sep. 13, 2017, 7 pages.
"Chinese Office Action", for Chinese Application No. 200580046000.4, corresponding to U.S. Appl. No. 11/591,330, dated May 24, 2012, (pp. 12) Including English translation.
"Chinese Office Action", for Chinese Application No. 200580046000.4, corresponding to U.S. Appl. No. 11/591,330, dated Nov. 22, 2011, (pp. 12) Including English translation.
"Cost Effective Emissions Solutions for Diesel Engines", Donaldson Company brochure, 2004, 4 pages.
Dahiya, A et al., "Dry-Laid Nonwovens", http://www.engr.utk.edu/mse/pages/Textiles/Dry%20Laid%20Nonwovens.htm, (Apr. 2004), 10 pages.
"European Office Action", from the European Patent Office in EP Patent Application No. 06720573.2-1213, corresponding to U.S. Appl. No. 11/883,690, dated May 13, 2011, (pp. 3).
"Examiner's Pre-Review Report", for Japanese Patent Application No. 2007-540069, dated Feb. 8, 2013 (4 pages).
"Examiner Report", from CA Application No. 2586636, dated Feb. 8, 2012 (pp. 1-5).
"Extended European Search Report", from EP Application No. 07119967.3, corresponding to U.S. Appl. No. 11/381,010, dated May 6, 2008, pp. 1-6.
"Extended European Search Report", from EP Application No. 10010697.0, dated Mar. 9, 2011, pp. 1-4.
"Extended European Search Report", dated Mar. 3, 2011, in co-pending European Patent Application 10010698.8 (4 pages).
"File History", for co-pending U.S. Appl. No. 10/892,538, filed Nov. 5, 2004, entitled "Filter Media and Structure" (History occurring after May 18, 2011 IDS Filing: 49 pages).
"File History", for co-pending U.S. Appl. No. 10/982,538, filed Nov. 5, 2004, entitled "Filter Media and Structure", (415 pages).
"File History", for co-pending U.S. Appl. No. 11/381,010, filed May 1, 2006, entitled "Filter Medium and Breather Filter Structure", (325 pages).
"File History", for co-pending U.S. Appl. No. 11/986,377, filed Nov. 20, 2007, entitled "High Strength, High Capacity Filter Media and Structure", (275 pages).
"File History", for co-pending U.S. Appl. No. 12/694,913, filed Jan. 27, 2010, entitled "Fibrous Media", (188 pages).
"File History", for co-pending U.S. Appl. No. 12/694,935, filed Jan. 27, 2010, entitled "Method and Apparatus for Forming a Fibrous Media", (183 pages).
"File History", for co-pending U.S. Appl. No. 11/381,010, filed May 1, 2006, entitled "Filter Medium and Breather Filter Structure" (History occurring after May 18, 2011 IDS Filing: 51 Pages).
"File History", for co-pending U.S. Appl. No. 11/381,010, filed May 1, 2006, entitled "Filter Medium and Breather Filter Structure" (History occurring after Aug. 31, 2011 IDS Filing: 39 Pages).
"File History", for co-pending U.S. Appl. No. 11/986,377, filed Nov. 20, 2007, entitled "High Strength, High Capacity Filter Media and Structure" (History occurring after May 18, 2011 IDS Filing: 9 pages).
"File History", for co-pending U.S. Appl. No. 12/694,935, filed Jan. 27, 2010, entitled "Method and Apparatus for Forming a Fibrous Media" (History occurring after May 18, 2011 IDS Filing: 86 pages).
"File History", for co-pending U.S. Appl. No. 12/694,935, filed Jan. 27, 2010, entitled "Method and Apparatus for Forming a Fibrous Media" (History occurring after Aug. 31, 2011 IDS Filing: 58 pages).
"File History", for co-pending U.S. Appl. No. 12/694,913, filed Jan. 27, 2010, entitled "Fibrous Media" (History occurring after May 18, 2011 IDS Filing: 63 pages).
"File History", for co-pending U.S. Appl. No. 12/694,913, filed Jan. 27, 2010, entitled "Fibrous Media" (History occurring after Aug. 31, 2011 IDS Filing: 13 pages).
"Filter Bag", Nonwoven Industry, Mar. 1992, vol. 23, No. 3, pp. 5 and 68.
"Filtration—Daiwabo and Kyowa Jointly Produce Microfiber Filter", Nonwovens Markets Feb. 14, 1992, vol. 7, No. 4, p. 5.
"Final Office Action", from JP Application No. 2007-540069, corresponding to U.S. Appl. No. 11/267,958, dated Jul. 2, 2012, (pp. 4).
"Final Office Action", from JP Application No. 2007-540069, corresponding to U.S. Appl. No. 11/267,958, dated Jul. 22, 2011, (pp. 18) Including English translation.
"Final Office Action", Final Office Action from KR Application No. 1 0-2007-7012741, dated Feb. 21, 2013, 8 pgs.
"Final Rejection", for Japanese Application No. 2011-233239, dated Apr. 5, 2013 (7 pages).
"First Office Action", for Chinese Application No. 201010255252.0, corresponding to U.S. Appl. No. 11/381,010, dated May 25, 2011, (pp. 16) Including English translation.
"First Office Action", for Chinese Application No. 201010255270.9, corresponding to U.S. Appl. No. 11/267,958, dated Aug. 25, 2011, (pp. 14) Including English translation.

(56) References Cited

OTHER PUBLICATIONS

"2.2 The Fourdrinier", http://www.paper.org.uk/papertech/data/unit_03/2_mechanical_methods/2-2_fourdrinier . . . . Sep. 24, 2007, 7 pages.
Frautmann, P et al., "High Performance Nanofibre Coated Filter Media for Engine Intake Air Filtration", Filtration, vol. 6, No. 1, pp. 53-56 (2006).
Hagewood, J. , "Bicomponent Filtration: Variable Capacity Continuous Extended Area Filter", International Fiber Journal Feb. 1998, vol. 14, No. 1, pp. 58-67.
Hansen, L et al., "Water Absorption and Mechanical Properties of Electrospun Structured Hydrogels", Journal of Applied Polymer Science, vol. 95, pp. 427-434 (2005).
"HEPA & 95% DOP Panel Filters", Donaldson Company Torit brochure, 2004, 4 pages.
Hinds, W, Aerosol Technology Properties, Behavior, and Measurement of Airborne Particles, Second Edition, (Copyright 1999), 3 pages.
"Japanese Office Action", from JP Application No. 2011233239, dated Jul. 30, 2012, (pp. 1-2).
Ko, F et al., "Electrospinning of Continuous Carbon Nanotube-Filled Nanofiber Yarns", Adv. Mater., vol. 15, No. 14, pp. 1161-1165, (Jul. 17, 2003).
"Korean Office Action", from KR Application No. 10-2007-7012741, dated Jul. 19, 2012, (pp. 1-27), including English translation.
Lennox-Kerr, "Advances in Textiles Technology", International Newsletters Ltd., UK Sep. 2003 , vol. 153, 3 pages.
"Migration of Superabsorbent Polymer (SAP) Media Downstream of Filtration", Velcron Filters, Inc. Service Bulletin, May 2007, http://www.velcon.com/doc/Vo16-Npl-05.21.07.pdf.
"Non-Final Office Action", dated May 3, 2012in co-pending U.S. Appl. No. 11/884,743, "Aerosol Separator" (31 pages).
"Non-Final Office Action", dated Jul. 19, 2011 in co pending U.S. Appl. No. 11/883,690, "Aerosol Separator; and Method" (14 pages).
"Non-Final Office Action", dated Oct. 28, 2011 in co-pending U.S. Appl. No. 13/110,148, "Filter Medium and Structure" (30 pages).
"Non-Final Office Action", dated Apr. 28, 2011 in co pending U.S. Appl. No. 11/381,010, "Filter Medium and Breather Filter Structure" (30 pages).
"Non-Final Office Action", dated Jun. 29, 2012 in co-pending U.S. Appl. No. 13/461,228, 18 pages.
"Non-Final Office Action", dated Dec. 22, 2011 in co-pending U.S. Appl. No. 13/222,063, "Filter Medium and Structure" (24 pages).
"Non-Final Office Action", dated Jan. 7, 2013 in co-pending U.S. Appl. No. 13/591,699, "Filter Medium and Breather Filter Structure," p. 1-58 (58 pages).
"Notice of Allowance", from JP Application No. 2009147316, dated Apr. 11, 2011, (pp. 1-8).
"Notice of Allowance", for Mexico Application No. MX/a/2010/008502, dated Apr. 23, 2013 (2 pages).
"Notice of Allowance", dated Aug. 31, 2011 in co-pending U.S. Appl. No. 11/381,010, "Filter Medium and Breather Filter Structure" (6 pages).
"Notice of Allowance", dated Jan. 17, 2012 in co-pending U.S. Appl. No. 11/883,690, "Aerosol Separator; and Method" (26 pages).
"Notice of Allowance", dated May 7, 2012 in co-pending U.S. Appl. No. 13/110,148, "Filter Medium and Structure" (11pages).
"Notice of Allowance", dated Jun. 25, 2012 in co-pending U.S. Appl. No. 13/222,063, "Filter Medium and Structure," (10 pages).
"Notice of Allowance Received", dated Nov. 26, 2012 in co-pending U.S. Appl. No. 11/884,743, "Aerosol Separator," (60 pages).
"Notice of Allowance", from U.S. Appl. No. 13/591,669, dated May 16, 2013, 20 pages.
"Office Action", for Chinese Application No. 200580046000.4, dated Feb. 21, 2011, (10 pages), including English translation.
"PCT International Search Report and Written Opinion", from International Application No. PCT/US2005/039793, corresponding to U.S. Appl. No. 10/982,538, dated Mar. 23, 2006, pp. 1-11.
"PCT International Search Report and Written Opinion", from International Application No. PCT/US2007/00963, corresponding to U.S. Appl. No. 11/381,010, dated Nov. 21, 2007, pp. 1-14.
"PCT International Search Report and Written Opinion", from International Application No. PCT/US2008/054574, corresponding to U.S. Appl. No. 12/036,022, dated Aug. 29, 2008, pp. 1-11.
"Physical Properties and Compositions Testing Table", U.S. Pat. No. 5,580,459 Examples, Dec. 10, 2012, (1 page).
Puurtinen, "Multilayering of Fine Paper With 30 Layer Headbox and Roll and Blade Gap Former", Helsinki University of Technology, Laboratory of Paper Technology Reports, Series A19 May 14, 2004, pp. 1-54.
"Response to Chinese Office Action", dated Aug. 25, 2011 Filed in the Chinese Patent Office on Nov. 29, 2011 for Chinese Patent Application No. 201010255270.9, corresponding to U.S. Appl. No. 11/267,958, (pp. 15).
"Response to Chinese Office Action", dated Mar. 8, 2011 Filed in the Chinese Patent Office on Jul. 11, 2011 for Chinese Patent Application No. 200580046000.4, corresponding to U.S. Appl. No. 11/267,958, (pp. 25).
"Response to Chinese Office Action", dated May 25, 2011 Filed in the Chinese Patent Office on Nov 29, 2011 for Chinese Patent Application No. 201010255252.0, corresponding to U.S. Appl. No. 11/267,958, (pp. 18).
"Response to Chinese Office Action", dated Nov. 22, 2011 Filed in the Chinese Patent Office on Jan. 18, 2012 for Chinese Patent Application No. 200580046000.4 corresponding to U.S. Appl. No. 11/267,958, (pp. 15).
"Response to Office Communication", Response to European Examination Report, dated Jul. 19, 2011, Filed in the European Patent Office on Oct. 11, 2011 for EP Patent Application No. 07119965.7, corresponding to U.S. Appl. No. 13/222,063, (pp. 48).
"Second Office Action", for Chinese Application No. 201010255252.0, corresponding to U.S. Appl. No. 11/381,010, dated Jun. 19, 2012 pp. 20) Including English translation.
"Second Office Action", for Chinese Application No. 201010255270.9, corresponding to U.S. Appl. No. 11/267,958, dated May 17, 2012, (pp. 19) Including English translation.
"Second Office Action", from CA Application No. 2586636, dated May 23, 2012 (pp. 1-4).
"Third Office Action", from CN Application No. 201010255252.0, dated Jan. 29, 2013, 10 pages.
"Three-Dimensional Structure Incorporates Heterofil Fibre and Carbon Beads", Nonwovens Report, International Oct. 1995 , No. 295, pp. 8-9.
Zhao, R., "An Investigation of Bicomponent Polypropylene/Poly(ethylene Terephthalate) Melt Blown Microfiber Nonwovens, a Dissertation", Front Cover Dec. 2001, pp. i-xix, pp. 1-207, 3 information pages.
ASTM D 737-04 "Standard Test Method for Air Permeability of Textile Fabrics", Jan. 2005, ASTM International, West Conshohocken, Pennsylvania, 5 pages.
ASTM D 737-96 "Standard Test Method for Air Permeability of Textile Fabrics", Apr. 1996, ASTM International, West Conshohocken, Pennsylvania, 5 pages.
Hutten, *Handbook of Non-woven Filter Media*, 2007, Butterworth-Heinemann/Elsevier, Oxford UK, Title page, Publication page, pp. 114-115 and 247.
Hutten, Section 6.7, "Solidity and Porosity", in *Handbook of Non-woven Filter Media*, 2007, Butterworth-Heinemann/Elsevier, Oxford UK, Title page, Publication page, and pp. 250-253.

* cited by examiner

FILTER MEDIUM AND BREATHER FILTER STRUCTURE

RELATED APPLICATION

This application is a continuing application of U.S. application Ser. No. 14/134,604, filed Dec. 19, 2013, which is a continuing application of Ser. No. 13/616,088, filed Sep. 14, 2012, now U.S. Pat. No. 8,641,796, which issued on Feb. 4, 2014, which is a continuing application of Ser. No. 13/591,669, filed Aug. 22, 2012, now U.S. Pat. No. 8,512,435, which issued on Aug. 20, 2013, which is a continuing application of U.S. application Ser. No. 13/222,063, filed Aug. 31, 2011, now U.S. Pat. No. 8,277,529, which issued on Oct. 2, 2012, which is a continuing application of U.S. application Ser. No. 13/110,148, filed May 18, 2011, now U.S. Pat. No. 8,268,033, which issued on Sep. 18, 2012, which is a continuing application of U.S. application Ser. No. 11/381,010, filed May 1, 2006, now U.S. Pat. No. 8,057,567, which issued on Nov. 15, 2011, which is a continuation-in-part of U.S. application Ser. No. 11/267,958 filed Nov. 4, 2005, now U.S. Pat. No. 7,314,497, which issued on Jan. 1, 2008, which claims priority under 35 U.S.C. § 119(e) to U.S. provisional application Ser. No. 60/625,439 filed Nov. 5, 2004 and 60/650,051 filed Feb. 4, 2005, the disclosures of which are incorporated by reference herein.

FIELD OF THE INVENTION

The invention relates to a formed layer, a filtration medium or media, and a filter having strength, compressibility and high capacity for particulate removal from a moving fluid (air, gas, or liquid) stream. The filter and filter medium comprises a non-woven web made suitable for particulate removal from mobile liquids and gasses using permeability, efficiency, loading and other filtration parameters. The invention relates to non-woven media layers obtaining sufficient tensile strength, wet strength, burst strength and other properties to survive the common operating conditions, such as variation in flow rate, temperature, pressure and particulate loading while removing substantial particulate loads from the fluid stream. The invention further relates to filter structures comprising one or more layers of the particulate removing media with other layers of similar or dissimilar media. These layers can be supported on a porous or perforate support and can provide mechanical stability during filtering operations. These structures can be formed into any of many filter forms such as panels, cartridge, inserts, etc. This disclosure relates to media layers and to methods of filtration of gas and aqueous or non-aqueous liquids. Gaseous streams can include both air and industrial waste gasses. Liquids can include water, fuels, oil, hydraulics, and others. The disclosure also relates to systems and methods for separating entrained particulate from the gas or liquid. The invention also relates to hydrophobic fluids (such as oils or an aqueous oil emulsion or other oil mixture) that are entrained as aerosols, from gas streams (for example airborne aerosol or aerosols in crankcase gases). Preferred arrangements also provide for filtration of other fine contaminants, for example carbon material, from the gas streams. Methods for conducting the separations are also provided.

BACKGROUND OF THE INVENTION

Non-woven webs for many end uses, including filtration media, have been manufactured for many years. Such structures can be made from bicomponent or core shell materials are disclosed in, for example, Wincklhofer et al., U.S. Pat. No. 3,616,160; Sanders, U.S. Pat. No. 3,639,195; Perrotta, U.S. Pat. No. 4,210,540; Gessner, U.S. Pat. No. 5,108,827; Nielsen et al., U.S. Pat. No. 5,167,764; Nielsen et al., U.S. Pat. No. 5,167,765; Powers et al., U.S. Pat. No. 5,580,459; Berger, U.S. Pat. No. 5,620,641; Hollingsworth et al., U.S. Pat. No. 6,146,436; Berger, U.S. Pat. No. 6,174,603; Dong, U.S. Pat. No. 6,251,224; Amsler, U.S. Pat. No. 6,267,252; Sorvari et al., U.S. Pat. No. 6,355,079; Hunter, U.S. Pat. No. 6,419,721; Cox et al., U.S. Pat. No. 6,419,839; Stokes et al., U.S. Pat. No. 6,528,439; Amsler, U.S. Pat. No. H2,086, U.S. Pat. Nos. 5,853,439; 6,171,355; 6,355,076; 6,143,049; 6,187,073; 6,290,739; and 6,540,801; 6,530,969. This application incorporates by reference PCT Publication WO 01/47618 published on Jul. 5, 2001, and PCT Publication WO 00/32295 published on Jun. 8, 2000. Such structures have been applied and made by both air laid and wet laid processing and have been used in fluid, both gaseous and air and aqueous and non-aqueous liquid filtration applications, with some degree of success. In this regard we have found that the non-woven webs that are used for particulate removal from mobile fluids often suffer from a number of disadvantages.

Many attempts to obtain such non-woven structures with suitable perforate supports have been made. In many melt blown materials and layers made with thermal lamination techniques, the resulting structures often obtain incorrect pore sizes, reduced efficiency, reduced permeability, lack of strength or other problems rendering the media or filter structure insufficient for useful fluid filtration applications.

A substantial need exists for filtration media, filter structures and filtration methods that can be used for removing particulate materials from fluid streams, and in particular gaseous streams such as air, aqueous, and non-aqueous liquids such as lubricating oils and hydraulic fluids. The invention provides such media, filtration structures and methods and provides a unique media or media layer combinations that achieve substantial permeability, high media strength, substantial efficiency and long filtration life.

Certain gas streams, such as blow-by gases from the crankcase of diesel engines, carry substantial amounts of entrained oils therein, as aerosol. The majority of the oil droplets within the aerosol are generally within the size of 0.1-5.0 microns. In addition, such gas streams also carry substantial amounts of fine contaminant, such as carbon contaminants. Such contaminants generally have an average particle size of about 0.5-3.0 microns. It is preferred to reduce the amount of such contaminants in these systems. A variety of efforts have been directed to the above types of concerns. The variables toward which improvements are desired generally concern the following:

(a) size/efficiency concerns; that is, a desire for good efficiency of separation while at the same time avoidance of a requirement for a large separator system;

(b) cost/efficiency; that is, a desire for good or high efficiency without the requirement of substantially expensive systems; (c) versatility; that is, development of systems that can be adapted for a wide variety of applications and uses, without significant re-engineering; and, (d) cleanability/regeneratability; that is, development of systems which can be readily cleaned (or regenerated) if such becomes desired, after prolonged use.

BRIEF DESCRIPTION OF THE INVENTION

We have found a filter medium or media and a unique filter structure capable of efficiently removing particulate from a mobile fluid stream under a variety of conditions. The medium of the invention combines high strength with excellent filtration properties. The invention comprises a thermally bonded sheet, filter medium or filter containing a shaped or formed medium. Combining substantial proportions of an organic or inorganic media fiber, a bicomponent thermoplastic binder fiber, optionally a resin binder, a secondary fiber or other filtration materials in a formed layer makes these sheet materials. The use of the bicomponent fiber enables the formation of a media layer or filter element that can be formed with no separate resin binder or with minimal amounts of a resin binder that substantially reduces or prevents film formation from the binder resin and also prevents lack of uniformity in the media or element due to migration of the resin to a particular location of the media layer. The use of the bicomponent fiber permits reduced compression, improves solidity, increases tensile strength and improves utilization of media fiber such as glass fiber and other fine fiber materials added to the media layer or filter element. Media fiber is that fiber that provides filtration properties to the media such as controllable pore size, permeability and efficiency. Further, the bicomponent fiber obtains improved processability during furnish formulation, sheet or layer formation and downstream processing including thickness adjustment, drying, cutting and filter element formation. These components combine in various proportions to form a high strength material having substantial filtration capacity, permeability and filtration lifetime. The media of the invention can maintain, intact, filtration capacity for substantial periods of time at substantial flow rates and substantial efficiency.

We have found a filter media and a unique filter structure capable of removing particulate from a fluid stream. The media comprises a thermally bonded sheet, media, or filter made by combining a substantial proportion of a media fiber and a bicomponent thermoplastic binder fiber. The media can comprise glass fiber, a fiber blend of differing fiber diameters, a binder resin and a bicomponent thermoplastic binder fiber. Such a media can be made with optional secondary fibers and other additive materials. These components combine to form a high strength material having substantial flow capacity, permeability and high strength. The media of the invention can maintain intact filtration capacity at high pressure for a substantial period of time. The media and filter operate at substantial flow rate, high capacity and substantial efficiency.

A first aspect of the invention comprises a filtration media or medium having a thermally bonded non-woven structure.

A second aspect of the invention comprises a bilayer, tri layer or multilayer (4-20, 4-64 or 4-100 layers) filtration medium or media. In one embodiment, the medium comprises the mobile fluid passing first through one layer comprising a loading layer and subsequently through another layer comprising an efficiency layer. A layer is a region of the material containing a different fibrous structure that may be attained by changing the amount of fiber, the sizes or amount of different fibers used, or by changing the process conditions. Layers may be made separately and combined later or simultaneously.

A third aspect of the invention comprises a filter structure. The structure can comprise a media layer or can comprise a 2 to 100 filtration media layer of the invention. Such layers can comprise a loading layer filtration media of the invention, and an efficiency layer filtration media of the invention or combinations thereof also combined with other filtration layers, support structures and other filter components.

A fourth aspect having high filtration performance comprises a depth loading media that does not compress or tear when subjected to application conditions or conversion processes. Such media can have low solidity as a result of relatively large spacing bicomponent and filter fiber.

A fifth aspect of the invention comprises a method of filtering the mobile fluid phase having a particulate load using the filtration aspects of the invention. The pervious support structure can support the media under the influence of fluid under pressure passing through the media and support. The mechanical support can comprise additional layers of the perforate support, wire support, a high permeability scrim or other support. This media commonly is housed in a filter element, panel, cartridge or other unit commonly used in the filtration of non-aqueous or aqueous liquids.

An additional aspect of the invention comprises a method of filtering with preferred crankcase ventilation (CCV) filters. It particularly concerns use of advantageous filter media, in arrangements to filter crankcase gases. The preferred media is provided in sheet form from a wet laid process. It can be incorporated into filter arrangements, in a variety of ways, for example by a wrapping or coiling approach or by providing in a panel construction. According to the present disclosure, filter constructions for preferred uses to filter blow-by gases from engine crankcases are provided. Example constructions are provided. Also provided are preferred filter element or cartridge arrangements including the preferred type of media. Further, methods are provided.

Medium materials of the invention can be used in a variety of filter applications including pulse clean and non-pulse cleaned filters for dust collection, gas turbines and engine air intake or induction systems; gas turbine intake or induction systems, heavy duty engine intake or induction systems, light vehicle engine intake or induction systems; vehicle cabin air; off road vehicle cabin air, disk drive air, photocopier-toner removal; HVAC filters in both commercial or residential filtration applications. Paper filter elements are widely used forms of surface loading media. In general, paper elements comprise dense mats of cellulose, synthetic or other fibers oriented across a gas stream carrying particulate material. The paper is generally constructed to be permeable to the gas flow, and to also have a sufficiently fine pore size and appropriate porosity to inhibit the passage of particles greater than a selected size therethrough. As the gases (fluids) pass through the filter paper, the upstream side of the filter paper operates through diffusion and interception to capture and retain selected sized particles from the gas (fluid) stream. The particles are collected as a dust cake on the upstream side of the filter paper. In time, the dust cake also begins to operate as a filter, increasing efficiency.

In general, the invention can be used to filter air and gas streams that often carry particulate material entrained therein. In many instances, removal of some or all of the particulate material from the stream is necessary for continued operations, comfort or aesthetics. For example, air intake streams to the cabins of motorized vehicles, to engines for motorized vehicles, or to power generation equipment; gas streams directed to gas turbines; and, air streams to various combustion furnaces, often include particulate material therein. In the case of cabin air filters it is desirable to remove the particulate matter for comfort of the passengers and/or for aesthetics. With respect to air and gas intake streams to engines, gas turbines and combustion furnaces, it is desirable to remove the particulate material because it can cause substantial damage to the internal workings to the various mechanisms involved. In other instances, production gases or off gases from industrial processes or engines may contain particulate material therein. Before such gases can be, or should be, discharged through various downstream equipment or to the atmosphere, it may be desirable to obtain a substantial removal of particulate material from those streams. In general, the technology can be applied to filtering liquid systems. In liquid filtering techniques, the collection mechanism is believed to be sieving when particles are removed through size exclusion. In a single layer the efficiency is that of the layer. The composite efficiency in a liquid application is limited by the efficiency of the single layer with the highest efficiency. The liquids would be directed through the media according to the invention, with particulates therein trapped in a sieving mechanism. In liquid filter systems, i.e. wherein the particulate material to be filtered is carried in a liquid, such applications include aqueous and non-aqueous and mixed aqueous/non-aqueous applications such as water streams, lube oil, hydraulic fluid, fuel filter systems or mist collectors. Aqueous streams include natural and man-made streams such as effluents, cooling water, process water, etc. Non-aqueous streams include gasoline, diesel fuel, petroleum and synthetic lubricants, hydraulic fluid and other ester based working fluids, cutting oils, food grade oil, etc. Mixed streams include dispersions comprising water in oil and oil in water compositions and aerosols comprising water and a non-aqueous component.

The media of the invention comprises an effective amount of a bicomponent binder fiber. "Bicomponent fiber" means a thermoplastic material having at least one fiber portion with a melting point and a second thermoplastic portion with a lower melting point. The physical configuration of these fibers is typically in a "side-by-side" or "sheath-core" structure. In side-by-side structure, the two resins are typically extruded in a connected form in a side-by-side structure. One could also use lobed fibers where the tips have lower melting point polymer. "Glass fiber" is fiber made using glass of various types. The term "secondary fibers" can include a variety of different fibers from natural synthetic or specialty sources. Such fibers are used to obtain a thermally bonded media sheet, media, or filter, and can also aid in obtaining appropriate pore size, permeability, efficiency, tensile strength, compressibility, and other desirable filter properties. The medium of the invention is engineered to obtain the appropriate solidity, thickness, basis weight, fiber diameter, pore size, efficiency, permeability, tensile strength, and compressibility to obtain efficient filtration properties when used to filter a certain mobile stream. Solidity is the solid fiber volume divided by the total volume of the filter medium, usually expressed as a percentage. For example, the media used in filtering a dust-laden air stream can be different from a media used for filtering a water or oil aerosol from an air stream. Further, the media used to remove particulates from a liquid stream can be different than a media used to remove particulates from an gaseous stream. Each application of the technology of the invention obtains from a certain set of operating parameters as discussed below.

The media of the invention can be made from a media fiber. Media fibers include a broad variety of fibers having the correct diameter, length and aspect ratio for use in filtration applications. One preferred media fiber is a glass fiber. A substantial proportion of glass fiber can be used in the manufacture of the media of the invention. The glass fiber provides pore size control and cooperates with the other fibers in the media to obtain a media of substantial flow rate, high capacity, substantial efficiency and high wet strength. The term glass fiber "source" means a glass fiber composition characterized by an average diameter and aspect ratio that is made available as a distinct raw material. Blends of one or more of such sources do not read on single sources.

We have found that by blending various proportions of bicomponent and media fiber that substantially improved strength and filtration can be obtained. Further, blending various fiber diameters can result in enhanced properties. Wet laid or dry laid processes can be used. In making the media of the invention, a fiber mat is formed using either wet or dry processing. The mat is heated to melt thermoplastic materials to form the media by internally adhering the fibers. The bicomponent fiber used in the media of the invention permits the fiber to fuse into a mechanically stable sheet, media, or filter. The bicomponent fiber having a thermally bonding exterior sheath causes the bicomponent fiber to bind with other fibers in the media layer. The bicomponent fiber can be used with an aqueous or solvent based resin and other fibers to form the medium.

In the preferred wet laid processing, the medium is made from an aqueous furnish comprising a dispersion of fibrous material in an aqueous medium. The aqueous liquid of the dispersion is generally water, but may include various other materials such as pH adjusting materials, surfactants, defoamers, flame retardants, viscosity modifiers, media treatments, colorants and the like. The aqueous liquid is usually drained from the dispersion by conducting the dispersion onto a screen or other perforated support retaining the dispersed solids and passing the liquid to yield a wet paper composition. The wet composition, once formed on the support, is usually further dewatered by vacuum or other pressure forces and further dried by evaporating the remaining liquid. After liquid is removed, thermal bonding takes place typically by melting some portion of the thermoplastic fiber, resin or other portion of the formed material. The melt material binds the component into a layer.

The media of this invention can be made on equipment of any scale from laboratory screens to commercial-sized papermaking. For a commercial scale process, the bicomponent mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. The general process involves making a dispersion of bicomponent fibers, glass fibers, or other medium material in an aqueous liquid, draining the liquid from the resulting dispersion to yield a wet composition, and adding heat to form, bond and dry the wet non-woven composition to form the useful medium.

DETAILED DESCRIPTION OF THE INVENTION

The media of the invention relates to a composite, non-woven, air laid or wet laid media having formability, stiffness, tensile strength, low compressibility, and mechanical stability for filtration properties; high particulate loading capability, low pressure drop during use and a pore size and efficiency suitable for use in filtering fluids. Preferably, the filtration media of the invention is typically wet laid and is made up of randomly oriented array of media fiber, such as a glass fiber, and a bicomponent fiber. These fibers are bonded together using the bicomponent fiber and sometimes with the addition of a binder resin to the invention. The media that can be used in the filters and methods of the invention contain an inorganic fiber, a bicomponent binder fiber, a binder and other components. The media fiber of the invention can include organic fibers such as natural and synthetic fibers including polyolefin, polyester, nylon, cotton, wool, etc. fibers. The media fiber of the invention can include inorganic fiber such as glass, metal, silica, polymeric fibers, and other related fibers.

The preferred filter structure of the invention comprises at least one media layer of the invention supported on a mechanically stable perforate support structure. The media and support are often packaged in a panel, cartridge or other filter format. The media layer can have a defined pore size for the purpose of removing particulates from fluid streams having a particle size of about 0.01 to 100 micrometers, from gas streams containing liquids in the form of a mist having droplet size of about 0.01 to 100 micrometers, from aqueous streams having a particle size of about 0.1 to 100 micrometers from non-aqueous streams having a particle size of about 0.05 to 100 micrometers or from fuel, lubricant or hydraulic streams having a particle size of about 0.05 to 100 micrometers. Additional information regarding filter structures can be found below.

Mechanical attributes are important for filter media including wet and dry tensile strength, burst strength, etc. Compressibility characteristic is important. Compressibility is the resistance (i.e.) to compression or deformation in the direction of fluid flow through the media. This must be sufficient to maintain a material's thickness and thereby maintain its pore structure and filtration flow and particulate removal performance. Many high efficiency wet laid materials using conventional resin saturation, melt blown materials, and other air laid materials lack this compressive strength and collapse under pressure. This is especially a problem with liquid filters, but can also be a problem with gas filters. In addition, media that are pleated must have sufficient tensile strength for processing into a finished filter with an integrated pleated structure. For example, pleating, corrugating, winding, threading, unwinding, laminating, coating, ultrasonically welding, dimpling or various other rolled goods operations. Materials without sufficient tensile strength may break during these processes.

Compressive strength is defined here as the percent change in thickness when the pressure applied during thickness measurement is increased. Compressive strengths typical of the materials made by the invention are as follows:

Compressive strength when pressure varied from 1.25 lb-in$^{-2}$ to 40 lb-in$^{-2}$: 8% to 40%

Compressive strength when pressure varied from 0.125 lb-in$^{-2}$ to 0.625 lb-in$^{-2}$: 10% to 20%

Tensile strength is defined here as the peak load is typically expressed as a peak load per unit width of dry media when running a force deflection test. The tensile strength will usually vary with sheet orientation. The orientation of interest for rolled goods operations is the machine direction. The range of machine direction tensile strength for these bicomponent sheets is from about 2 lb/(in width) to about 40 lb/(in width) or 5 lb/(in width) to about 35 lb/(in width). This will obviously vary with thickness and quantity of bicomponent fibers.

A filter with a gradient structure where the media pores become smaller on the downstream side is often helpful. In other words, the porous structure becomes continuously denser going from upstream to downstream side. As a result, the particles or contaminants to be filtered are able to penetrate to varying depths dependent on particle size. This causes the particles or contaminants to be distributed throughout the depth of the filter material, reducing the build up of pressure drop, and extending the life of the filter.

In other cases, for example, when filtering oil or water mists out of gas streams, it is often advantageous to use a filter with a gradient structure where the media pores become larger on the downstream side. In other words, the porous structure becomes less dense going from the upstream to downstream side. Generally, this results in less fiber surface area in the downstream regions. As a result, the captured droplets are forced to come together and coalesce into larger droplets. At the same time, these downstream regions are more open and allow the now larger droplets to drain from the filter material. These types of gradient structures may be made in a single layer by stratifying the finer fibers either downstream or upstream, or by forming and combining several discrete layers by applying a series of differing furnishes. Often, when combining discrete layers, the laminating techniques result in loss of useful filtration surface area. This is true of most adhesive laminating systems performed by coating one surface with adhesive and then contacting the layers together, whether this is done in a homogeneous coating or in a dot pattern. The same is true of point-bonded material using ultrasonic bonding. A unique feature when using bicomponent fibers in the filter sheet or material is the bicomponent not only bonds the fibers of individual layers together, but can also act to bond the layers together. This has been accomplished in conventional heat lamination as well as through pleating.

The filter media of the present invention is typically suited for high efficiency filtration properties such that fluids, including air and other gasses, aqueous and non-aqueous fuel, lubricant, hydraulic or other such fluids can be rapidly filtered to remove contaminating particulates.

Pressure-charged diesel engines often generate "blow-by" gases, i.e., a flow of air-fuel mixture leaking past pistons from the combustion chambers. Such "blow-by gases" generally comprise a gas phase, for example air or combustion off gases, carrying therein: (a) hydrophobic fluid (e.g., oil including fuel aerosol) principally comprising 0.1-5.0 micron droplets (principally, by number); and, (b) carbon contaminant from combustion, typically comprising carbon particles, a majority of which are about 0.1-10 microns in size. Such "blow-by gases" are generally directed outwardly from the engine block, through a blow-by vent. Herein when the term "hydrophobic" fluids is used in reference to the entrained liquid aerosol in gas flow, reference is meant to non-aqueous fluids, especially oils. Generally such materials are immiscible in water. Herein the term "gas" or variants thereof, used in connection with the carrier fluid, refers to air, combustion off gases, and other carrier gases for the aerosol. The gases may carry substantial amounts of other components. Such components may include, for example, copper, lead, silicone, aluminum, iron, chromium, sodium, molybdenum, tin, and other heavy metals. Engines operating in such systems as trucks, farm machinery, boats, buses, and other systems generally comprising diesel engines, may have significant gas flows contaminated as described above. For example, flow rates can be about 2-50 cubic feet per minute (cfm), typically 5 to 10 cfm. In such an aerosol separator in for example a turbocharged diesel engine, air is taken to the engine through an air filter, cleaning the air taken in from the atmosphere. A turbo pushes clean air into engine. The air undergoes compression and combustion by engaging with pistons and fuel. During the combustion process, the engine gives off blow-by gases. A filter arrangement is in gas flow communication with engine and cleans the blow-by gases that are returned to the air intake or induction system. The gasses and air is again pulled through by the turbo and into the engine. The filter arrangement in gas flow communication is used for separating a hydrophobic liquid phase from a gaseous stream (sometimes referred to herein as a coalescer/separator arrangement) is provided. In operation, a contaminated gas flow is directed into the coalescer/separator arrangement. Within the arrangement, the fine oil phase or aerosol phase (i.e., hydrophobic phase) coalesces. The arrangement is constructed so that as the hydrophobic phase coalesces into droplets, it will drain as a liquid such that it can readily be collected and removed from the system. With preferred arrangements as described herein below, the coalescer or coalescer/separator, especially with the oil phase in part loaded thereon, operates as a filter for other contaminant (such as carbon contaminant) carried in the gas stream. Indeed, in some systems, as the oil is drained from the system, it will provide some self-cleaning of the coalescer because the oil will carry therein a portion of the trapped carbon contaminant. The principles according to the present disclosure can be implemented in single stage arrangements or multistage arrangements. In many of the figures, multistage arrangements are depicted. In the general descriptions, we will explain how the arrangements could be varied to a single stage arrangement, if desired.

We have found, in one embodiment, that two filter media of this description can be combined in one embodiment. A loading layer and an efficiency layer can be used, each of said layers having distinct structures and filtration properties, to form a composite layer. The loading layer is followed in a fluid pathway by an efficiency layer. The efficiency layer is a highly efficient layer having suitable porosity, efficiency, permeability and other filtration characteristics to remove any remaining harmful particulate from the fluid stream as the fluid passes through the filter structure. The loading filtration media of the invention has a basis weight of about 30 to about 100 g-m$^{-2}$. The efficiency layer has a basis weight of about 40 to about 150 g-m$^{-2}$. The loading layer has an average pore size of about 5 to about 30 micrometers. The efficiency layer has a pore size smaller than the loading layer that ranges from about 0.5 to about 3 micrometers. The loading layer has a permeability that ranges from about 50 to 200 ft-min$^{-1}$. The efficiency layer has a permeability of about 5 to 30 ft-min$^{-1}$. The loading layer or the efficiency layer of the invention has a wet bursting strength of greater than about 5 lb-in$^{-2}$, typically about 10 to about 25 lb-in$^{-2}$. The combined filtration layer has a permeability of about 4 to 20 ft-min$^{-1}$; a wet burst strength of 10 to 20 lb-in$^{-2}$ and a basis weight of 100 to 200 g-m$^{-2}$.

Various combinations of polymers for the bicomponent fiber may be useful in the present invention, but it is important that the first polymer component melt at a temperature lower than the melting temperature of the second polymer component and typically below 205° C. Further, the bicomponent fibers are integrally mixed and evenly dispersed with the pulp fibers. Melting of the first polymer component of the bicomponent fiber is necessary to allow the bicomponent fibers to form a tacky skeletal structure, which upon cooling, captures and binds many of the secondary fibers, as well as binds to other bicomponent fibers.

In the sheath-core structure, the low melting point (e.g., about 80 to 205° C.) thermoplastic is typically extruded around a fiber of the higher melting (e.g., about 120 to 260° C.) point material. In use, the bicomponent fibers typically have a fiber diameter of about 5 to 50 micrometers often about 10 to 20 micrometers and typically in a fiber form generally have a length of 0.1 to 20 millimeters or often have a length of about 0.2 to about 15 millimeters. Such fibers can be made from a variety of thermoplastic materials including polyolefins (such as polyethylenes, polypropylenes), polyesters (such as polyethylene terephthalate, polybutylene terephthalate, PCT), nylons including nylon 6, nylon 6,6, nylon 6,12, etc. Any thermoplastic that can have an appropriate melting point can be used in the low melting component of the bicomponent fiber while higher melting polymers can be used in the higher melting "core" portion of the fiber. The cross-sectional structure of such fibers can be, as discussed above, the "side-by-side" or "sheath-core" structure or other structures that provide the same thermal bonding function. One could also use lobed fibers where the tips have lower melting point polymer. The value of the bicomponent fiber is that the relatively low molecular weight resin can melt under sheet, media, or filter forming conditions to act to bind the bicomponent fiber, and other fibers present in the sheet, media, or filter making material into a mechanically stable sheet, media, or filter.

Typically, the polymers of the bicomponent (core/shell or sheath and side-by-side) fibers are made up of different thermoplastic materials, such as for example, polyolefin/polyester (sheath/core) bicomponent fibers whereby the polyolefin, e.g. polyethylene sheath, melts at a temperature lower than the core, e.g. polyester. Typical thermoplastic polymers include polyolefins, e.g. polyethylene, polypropylene, polybutylene, and copolymers thereof, polytetrafluoroethylene, polyesters, e.g. polyethylene terephthalate, polyvinyl acetate, polyvinyl chloride acetate, polyvinyl butyral, acrylic resins, e.g. polyacrylate, and polymethylacrylate, polymethylmethacrylate, polyamides, namely nylon, polyvinyl chloride, polyvinylidene chloride, polystyrene, polyvinyl alcohol, polyurethanes, cellulosic resins, namely cellulosic nitrate, cellulosic acetate, cellulosic acetate butyrate, ethyl cellulose, etc., copolymers of any of the above materials, e.g. ethylene-vinyl acetate copolymers, ethylene-acrylic acid copolymers, styrene-butadiene block copolymers, Kraton rubbers and the like. Particularly preferred in the present invention is a bicomponent fiber known as 271P available from DuPont. Others fibers include FIT 201, Kuraray N720 and the Nichimen 4080 and similar materials. All of these demonstrate the characteristics of cross-linking the sheath poly upon completion of first melt. This is important for liquid applications where the application temperature is typically above the sheath melt temperature. If the sheath does not fully crystallize then the sheath polymer will remelt in application and coat or damage downstream equipment and components.

Media fibers are fibers that can aid in filtration or in forming a structural media layer. Such fiber is made from a number of both hydrophilic, hydrophobic, oleophilic, and oleophobic fibers. These fibers cooperate with the glass fiber and the bicomponent fiber to form a mechanically stable, but strong, permeable filtration media that can withstand the mechanical stress of the passage of fluid materials and can maintain the loading of particulate during use. Such fibers are typically monocomponent fibers with a diameter that can range from about 0.1 to about 50 micrometers and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of structural fiber cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

Thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

The preferred media fiber comprises a glass fiber used in media of the present invention include glass types known by the designations: A, C, D, E, Zero Boron E, ECR, AR, R, S, S-2, N, and the like, and generally, any glass that can be made into fibers either by drawing processes used for making reinforcement fibers or spinning processes used for making thermal insulation fibers. Such fiber is typically used as a diameter about 0.1 to 10 micrometers and an aspect ratio (length divided by diameter) of about 10 to 10000. These commercially available fibers are characteristically sized with a sizing coating. Such coatings cause the otherwise ionically neutral glass fibers to form and remain in bundles. Glass fiber in diameter less than about 1 micron is not sized. Large diameter chopped glass is sized.

Manufacturers of glass fibers commonly employ sizes such as this. The sizing composition and cationic antistatic agent eliminates fiber agglomeration and permits a uniform dispersion of the glass fibers upon agitation of the dispersion in the tank. The typical amount of glass fibers for effective dispersion in the glass slurry is within the range of 50% to about 90%, and most preferably about 50-80%, by weight of the solids in the dispersion. Blends of glass fibers can substantially aid in improving permeability of the materials. We have found that combining a glass fiber having an average fiber diameter of about 0.3 to 0.5 micrometer, a glass fiber having an average fiber diameter of about 1 to 2 micrometers, a glass fiber having an average fiber diameter of about 3 to 6 micrometers, a glass fiber with a fiber diameter of about 6 to 10 micrometers, and a glass fiber with a fiber diameter of about 10 to 100 micrometers in varying proportions can substantially improve permeability. We believe the glass fiber blends obtain a controlled pore size resulting in a defined permeability in the media layer. Binder resins can typically comprise water-soluble or water sensitive polymer materials. Its polymer materials are typically provided in either dry form or aqueous dispersions. Such useful polymer materials include acrylic polymers, ethylene vinyl acetate polymers, ethylene vinyl polyvinyl alcohol, ethylene vinyl alcohol polymers, polyvinyl pyrrolidone polymers, and natural gums and resins useful in aqueous solution.

We have surprisingly found that the media of the invention have a surprising thermal property. The media after formation and thermal bonding at or above the melt temperature of the lower melting portion of the bicomponent fiber, can be used at temperatures above that melting temperature. Once thermally formed, the media appears to be stable at temperatures at which the media should lose mechanical stability due to the softening or melting of the fiber. We believe that there is some interaction in the bonded mass that prevents the melting of the fiber and the resulting failure of the media. Accordingly, the media can be used with a mobile gaseous or liquid phase at a temperature equal to or 10 to 100° F. above the melt temperature of the lower melting portion of the bicomponent fiber. Such applications include hydraulic fluid filtration, lubricant oil filtration, hydrocarbon fuel filtration, hot process gas filtration, etc.

Binder resins can be used to help bond the fiber into a mechanically stable media layer. Such thermoplastic binder resin materials can be used as a dry powder or solvent system, but are typically aqueous dispersions (a latex or one of a number of lattices) of vinyl thermoplastic resins. A resinous binder component is not necessary to obtain adequate strength for the papers of this invention, but can be used. Resin used as binder can be in the form of water soluble or dispersible polymer added directly to the paper making dispersion or in the form of thermoplastic binder fibers of the resin material intermingled with the aramid and glass fibers to be activated as a binder by heat applied after the paper is formed. Resins include vinyl acetate materials, vinyl chloride resins, polyvinyl alcohol resins, polyvinyl acetate resins, polyvinyl acetyl resins, acrylic resins, methacrylic resins, polyamide resins, polyethylene vinyl acetate copolymer resins, thermosetting resins such as urea phenol, urea formaldehyde, melamine, epoxy, polyurethane, curable unsaturated polyester resins, polyaromatic resins, resorcinol resins and similar elastomer resins. The preferred materials for the water soluble or dispersible binder polymer are water soluble or water dispersible thermosetting resins such as acrylic resins. methacrylic resins, polyamide resins, epoxy resins, phenolic resins, polyureas, polyurethanes, melamine formaldehyde resins, polyesters and alkyd resins, generally, and specifically, water soluble acrylic resins. methacrylic resins, polyamide resins, that are in common use in the papermaking industry. Such binder resins typically coat the fiber and adhere fiber to fiber in the final non-woven matrix. Sufficient resin is added to the furnish to fully coat the fiber without causing film over of the pores formed in the sheet, media, or filter material. The resin can be added to the furnish during papermaking or can be applied to the media after formation.

The latex binder used to bind together the three-dimensional non-woven fiber web in each non-woven layer or used as the additional adhesive, can be selected from various latex adhesives known in the art. The skilled artisan can select the particular latex adhesive depending upon the type of cellulosic fibers that are to be bound. The latex adhesive may be applied by known techniques such as spraying or foaming. Generally, latex adhesives having from 15 to 25% solids are used. The dispersion can be made by dispersing the fibers and then adding the binder material or dispersing the binder material and then adding the fibers. The dispersion can, also, be made by combining a dispersion of fibers with a dispersion of the binder material. The concentration of total fibers in the dispersion can range from 0.01 to 5 or 0.005 to 2 weight percent based on the total weight of the dispersion. The concentration of binder material in the dispersion can range from 10 to 50 weight percent based on the total weight of the fibers.

Non-woven media of the invention can contain secondary fibers made from a number of both hydrophilic, hydrophobic, oleophilic, and oleophobic fibers. These fibers cooperate with the glass fiber and the bicomponent fiber to form a mechanically stable, but strong, permeable filtration media that can withstand the mechanical stress of the passage of fluid materials and can maintain the loading of particulate during use. Secondary fibers are typically monocomponent fibers with a diameter that can range from about 0.1 to about 50 micrometers and can be made from a variety of materials including naturally occurring cotton, linen, wool, various cellulosic and proteinaceous natural fibers, synthetic fibers including rayon, acrylic, aramide, nylon, polyolefin, polyester fibers. One type of secondary fiber is a binder fiber that cooperates with other components to bind the materials into a sheet. Another type of secondary fiber is a structural fiber that cooperates with other components to increase the tensile and burst strength the materials in dry and wet conditions. Additionally, the binder fiber can include fibers made from such polymers as polyvinyl chloride, polyvinyl alcohol. Secondary fibers can also include inorganic fibers such as carbon/graphite fiber, metal fiber, ceramic fiber and combinations thereof.

The secondary thermoplastic fibers include, but are not limited to, polyester fibers, polyamide fibers, polypropylene fibers, copolyetherester fibers, polyethylene terephthalate fibers, polybutylene terephthalate fibers, polyetherketoneketone (PEKK) fibers, polyetheretherketone (PEEK) fibers, liquid crystalline polymer (LCP) fibers, and mixtures thereof. Polyamide fibers include, but are not limited to, nylon 6, 66, 11, 12, 612, and high temperature "nylons" (such as nylon 46) including cellulosic fibers, polyvinyl acetate, polyvinyl alcohol fibers (including various hydrolysis of polyvinyl alcohol such as 88% hydrolyzed, 95% hydrolyzed, 98% hydrolyzed and 99.5% hydrolyzed polymers), cotton, viscose rayon, thermoplastic such as polyester, polypropylene, polyethylene, etc., polyvinyl acetate, polylactic acid, and other common fiber types. The thermoplastic fibers are generally fine (about 0.5-20 denier diameter), short (about 0.1-5 cm long), staple fibers, possibly containing precompounded conventional additives, such as antioxidant, stabilizers, lubricants, tougheners, etc. In addition, the thermoplastic fibers may be surface treated with a dispersing aid. The preferred thermoplastic fibers are polyamide and polyethylene terephthalate fibers, with the most preferred being polyethylene terephthalate fibers.

Fluoro-organic wetting agents useful in this invention for addition to the fiber layers are organic molecules represented by the formula $$R_f\text{-G}$$

wherein $R_f$ is a fluoroaliphatic radical and G is a group which contains at least one hydrophilic group such as cationic, anionic, nonionic, or amphoteric groups. Nonionic materials are preferred. $R_f$ is a fluorinated, monovalent, aliphatic organic radical containing at least two carbon atoms. Preferably, it is a saturated perfluoroaliphatic monovalent organic radical. However, hydrogen or chlorine atoms can be present as substituents on the skeletal chain. While radicals containing a large number of carbon atoms may function adequately, compounds containing not more than about 20 carbon atoms are preferred since large radicals usually represent a less efficient utilization of fluorine than is possible with shorter skeletal chains. Preferably, $R_f$ contains about 2 to 8 carbon atoms.

The cationic groups that are usable in the fluoro-organic agents employed in this invention may include an amine or a quaternary ammonium cationic group which can be oxygen-free (e.g., —$NH_2$) or oxygen-containing (e.g., amine oxides). Such amine and quaternary ammonium cationic hydrophilic groups can have formulas such as —$NH_2$, —$(NH_3)X$, —$(NH(R^2)_2)X$, —$(NH(R^2)_3)X$, or —$N(R_2)_2\rightarrow O$, where x is an anionic counterion such as halide, hydroxide, sulfate, bisulfate, or carboxylate, $R^2$ is H or $C_{1-18}$ alkyl group, and each $R^2$ can be the same as or different from other $R^2$ groups. Preferably, $R^2$ is H or a $C_{1-16}$ alkyl group and X is halide, hydroxide, or bisulfate.

The anionic groups which are usable in the fluoro-organic wetting agents employed in this invention include groups which by ionization can become radicals of anions. The anionic groups may have formulas such as —COOM, —$SO_3M$, —$OSO_3M$, —$PO_3HM$, —$OPO_3M_2$, or —$OPO_3HM$, where M is H, a metal ion, $(NR^1_4)^+$, or $(SR^1_4)^+$, where each $R^1$ is independently H or substituted or unsubstituted $C_1$-$C_6$ alkyl. Preferably M is $Na^+$ or $K^+$. The preferred anionic groups of the fluoro-organo wetting agents used in this invention have the formula —COOM or —$SO_3M$. Included within the group of anionic fluoro-organic wetting agents are anionic polymeric materials typically manufactured from ethylenically unsaturated carboxylic mono- and diacid monomers having pendent fluorocarbon groups appended thereto. Such materials include surfactants obtained from 3M Corporation known as FC-430 and FC-431.

The amphoteric groups which are usable in the fluoro-organic wetting agent employed in this invention include groups which contain at least one cationic group as defined above and at least one anionic group as defined above.

The nonionic groups which are usable in the fluoro-organic wetting agents employed in this invention include groups which are hydrophilic but which under pH conditions of normal agronomic use are not ionized. The nonionic groups may have formulas such as —$O(CH_2CH_2)xOH$ where x is greater than 1, —$SO_2NH_2$, —$SO_2NHCH_2CH_2OH$, —$SO_2N(CH_2CH_2H)_2$, —$CONH_2$, —$CONHCH_2CH_2OH$, or —$CON(CH_2CH_2OH)_2$. Examples of such materials include materials of the following structure:

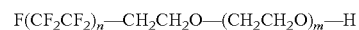

wherein n is 2 to 8 and m is 0 to 20.

Other fluoro-organic wetting agents include those cationic fluorochemicals described, for example in U.S. Pat. Nos. 2,764,602; 2,764,603; 3,147,064 and 4,069,158. Such amphoteric fluoro-organic wetting agents include those amphoteric fluorochemicals described, for example, in U.S. Pat. Nos. 2,764,602; 4,042,522; 4,069,158; 4,069,244; 4,090,967; 4,161,590 and 4,161,602. Such anionic fluoro-organic wetting agents include those anionic fluorochemicals described, for example, in U.S. Pat. Nos. 2,803,656; 3,255,131; 3,450,755 and 4,090,967.

There are numerous methods of modifying the surface of the fibers. Fibers that enhance drainage can be used to manufacture the media. Treatments can be applied during the manufacture of the fibers, during manufacture of the media or after manufacture of the media as a post treatment. Numerous treatment materials are available such as fluorochemicals or silicone containing chemicals that increase the contact angle. One example would be DuPont Zonyl fluorochemicals such as 8195. Numerous fibers incorporated into filter media can be treated to enhance their drainage capability. Bicomponent fibers composed of polyester, polypropylene or other synthetic polymers can be treated. Glass fibers, synthetic fibers, ceramic, or metallic fibers can also be treated. We are utilizing various fluorochemicals such as DuPont #8195, #7040 and #8300. The media grade is composed of 50% by mass DuPont 271P bicomponent fiber cut 6 mm long, 40% by weight DuPont Polyester 205 WSD cut 6 mm, and 10% by mass Owens Corning DS-9501-11W Advantex cut to 6 mm. This media grade was produced using the wet laid process on an inclined wire which optimizes the distribution of the fibers and uniformity of the media. The media is being post treated in media or element form with a dilute mixture of Zonyl incorporating a fugitive wetting agent (isopropyl alcohol), and DI water. The treated, wrapped element pack is dried and cured at 240 F to remove the liquid and activate the fluorochemical.

Examples of such materials are DuPont Zonyl FSN and DuPont Zonyl FSO nonionic surfactants. Another aspect of additives that can be used in the polymers of the invention include low molecular weight fluorocarbon acrylate materials such as 3M's Scotchgard material having the general structure:

$$CF_3(CX_2)_n\text{-acrylate}$$

wherein X is —F or —$CF_3$ and n is 1 to 7.

The following table sets forth the useful parameters of the layers of the invention:

TABLE 1

| Fluid | Contaminant | Layer | Bicomponent Fiber % | Bicomponent Fiber Diameter Micrometer | Glass Fiber % | Glass Fiber Diameter Micrometer |
|---|---|---|---|---|---|---|
| Air | Industrial Mist | 1, 2 or more | 20-80 50 | 5-15 13.0 | 80-20 50 | 0.1-5 1.6 |
| Air | Industrial Mist | 1 | 50 | 5-15 14.0 | 80-20 12.5 37.5 | 1.6 1.5 |
| Air | Industrial Mist | 1 | 20-80 | 5-15 14.0 | 80-20 50 | 1.5 |
| Air | Diesel Engine Crankcase Blowby | 1 | 20-80 50 | 5-15 14.0 | 0 10 | 11 |
| Air | Diesel Engine Crankcase Blowby | 1 | 10-30 | 5-15 12 | 35-50 | 0.4-3.4 |
| Diesel Engine Lube Oil | Soot | 1 2 3 or more | 1-40 20 20 20 | 5-15 12.0 12.0 12.0 | 60-99 80 80 80 | 0.1-5 0.32-0.51 0.43 0.32 |
| Diesel fuel | Particulate | 1 2 3 4 | 50 50-65 50-70 50 | 10-14 10-14 10-14 10-14 | 30-50 25-50 13-33 0-50 | 0.2-0.8 0.4-1 1.0-1.5 2.6 |
| Hydraulic | Particulate | 1, 2, 3, 4 or more | 20-80 50 50 50 50 | 5-15 12.0 12.0 12.0 12.0 | 80-20 50 33 33 50 | 0.1 0.8-2.6 1 0.8 0.51 |
| Air | Particulate | 1 or 2 | 80-98 | 10-15 | 3-12 | 0.5-2 |
| Air | Particulate | 1 | 90 | 12.0 | 10 | 0.6 |
| Air | Particulate | 1 | 95 | 12.0 | 5 | 0.6 |
| Air | Particulate | 1 | 97 | 12.0 | 3 | 0.6 |

| Fluid | Contaminant | Secondary Fiber % | Secondary Fiber Diameter Micrometer | Basis Weight g·m$^{-2}$ | Thickness mm 0.125 lb·in$^{-2}$ | 0.625 lb·in$^{-2}$ | 1.5 lb·in$^{-2}$ |
|---|---|---|---|---|---|---|---|
| Air | Industrial Mist | 0-10 0.1-10 | | 20-80 62.3 | 0.2-0.8 0.510 | 0.2-0.8 0.430 | 0.2-0.8 0.410 |
| Air | Industrial Mist | | | 128.2 | 1.27 | .993 | .892 |
| Air | Industrial Mist | | | 122.8 | 1.14 | .922 | .833 |
| Air | Diesel Engine Crankcase Blowby | 5-50% 10-40% Poly | 0.5-15 10-15 Polyester | 20-80 65.7 | 0.2-0.8 0.690 | 0.2-0.8 0.580 | 0.2-0.8 .530 |
| Air | Diesel Engine Crankcase Blowby | 20-55 15-25 | 7-13 Latex resin | 134 | | | 0.69 |
| Diesel Engine Lube Oil | Soot | 0-20 17 17 0 | | 10-50 40 32 28 | | | 0.2-0.8 0.3 0.25 0.2 |

TABLE 1-continued

| Fluid | Contaminant | | | | | | |
|---|---|---|---|---|---|---|---|
| Diesel fuel | Particulate | | 10-15 | 10 | 30-50 | 0.18-0.31 | |
| | | | 13-50 | 12-14 | | | |
| | | | 17 | 17 | | | |
| Hydraulic | Particulate | | 10-20 | | 10-50 | | 0.2-0.8 |
| | | | 18 | | 32 | | 0.23 |
| | | | 18 | | 37 | | 0.26 |
| | | | | | 39 | | 0.25 |
| | | | | | 34 | | 0.18 |
| Air | Particulate | | | | 40-350 | | 0.2-2 |
| Air | Particulate | | | | 45 | | 0.25 |
| Air | Particulate | | | | 110 | | 0.51 |
| Air | Particulate | | | | 300 | | 1.02 |

| Fluid | Contaminant | Compressibility % change from 0.125 lb-inch$^{-2}$ to 0.5 lb-inch$^{-2}$ | Solidity at 0.125 lb-inch$^{-2}$ % | Perm ft-min$^{-1}$ | MD Fold Tensile lb/ (in width) | Mean Pore Size Micrometer | 3160 DOP Efficiency 10.5 fpm % at 0.3 Micrometer |
|---|---|---|---|---|---|---|---|
| Air | Industrial Mist | 15 | 2-10 | 50-500 | 5-15 | 5-20 | 5-25 |
| | | | 6.9 | 204 | 3.9 | 17.8 | 12.0 |
| Air | Industrial Mist | 22 | 5.6 | 68 | 6.9 | 15.6 | 26.3 |
| Air | Industrial Mist | 19 | 6 | 50 | 8.6 | 14.4 | 39.7 |
| Air | Diesel Engine Crankcase Blowby | 14 | 6.7 | 50-300 | 5-15 | 5-20 | 5-20 |
| | | | | 392 | 2.6 | 43 | 6.0 |
| Air | Diesel Engine Crankcase Blowby | | | 33 | | | |
| Diesel fuel | Particulate | | | 6-540 | | 1.5-41 | |
| Diesel Engine | Soot | | 2-10 | 0.1-30 | | 0.5-10 | |
| | | | 45 | 7 | | 2 | |
| Lube Oil | | | 6 | 6 | | 1.2 | |
| | | | | 4 | | 1 | |
| Hydraulic | Particulate | | | 5-200 | | 0.5-30 | |
| | | | | 180 | | 19 | |
| | | | | 94 | | 6.9 | |
| | | | | 23 | | 2.6 | |
| | | | | 6.7 | | 0.94 | |
| Air | Particulate | | 10-25 | 20-200 | | 10-30 | |
| Air | Particulate | | 13 | 180 | | 26 | |
| Air | Particulate | | 17 | 90 | | 33 | |
| Air | Particulate | | 22 | 30 | | 12 | |

We have found improved technology of enhanced internal bond between fiber and fiber of the filter media. Bicomponent fiber can be used to form a fiber layer. During layer formation, a liquid resin can be used. In the resin saturation process of the media, the liquid binding resin can migrate to the outer sides of the filter media making the internal fibers of the media unbonded relatively. During the pleating process, the unbonded regions cause degrading media stiffness and durability and excessive manufacturing scrap. Bicomponent and homopolymer binder fibers were used in this invention to enhance the internal bonding between fiber and fiber of the filter media. Bicomponent fibers are coextruded with two different polymers in the cross section; they can be concentric sheath/core, eccentric sheath/core or side-by-side, etc.

The bicomponent fibers used in this work are concentric sheath/core:

TJ04CN Teijin Ltd. (Japan) 2.2 DTEX×5 mm sheath core PET/PET

3380 Unitika Ltd. (Japan) 4.4 DTEX×5 mm sheath core PET/PET

The homopolymer binder fiber 3300 sticks at 130° C. and has the dimension of 6.6 DTEX×5 mm. The sheath melting temperatures of TJ04CN and 3380 are at 130° C.; and the core melting temperatures of these binder fibers are at 250° C. Upon heating, the sheath fiber component begins to melt and spread out, attaching itself in the fiber matrix; and the core fiber component remains in the media and functions to improve the media strength and flexibility. Unpressed handsheets were made in the Corporate Media Lab at Donaldson. Also pressed handsheets were made and pressed at 150° C. (302° F.) for 1 minute. In the Description of the Invention, some codes and furnish percentages of the handsheets and the internal bond strength test results will be presented. Results show that the Teijin and Unitika binder fibers would improve internal bond strengths in the synthetic media.

Eight furnish formulations were created in this work. Below are the information about the furnish formulations. Johns Manville 108B and Evanite 710 are glass fibers. Teijin TJ04CN, Unitika 3380, and Unitika 3300 are binder fibers. Polyester LS Code 6 3025-LS is made by MiniFibers, Inc.

| Furnish | Fibers | % of Furnish | Weight (g) |
|---|---|---|---|
| Example 1 | Johns Manville 108B | 40 | 1.48 |
| | Unitika 3300 | 17.5 | 0.6475 |
| | Polyester LS Code 6 3025-LS | 42.5 | 1.5725 |

| Furnish | Fibers | % of Furnish | Weight (g) |
|---|---|---|---|
| Example 2 | Evanite 710 | 40 | 1.48 |
| | Unitika 3300 | 10 | 0.37 |
| | Polyester LS Code 6 3025-LS | 50 | 1.85 |

| Furnish | Fibers | % of Furnish | Weight (g) |
|---|---|---|---|
| Example 3 | Evanite 710 | 40 | 1.48 |
| | Unitika 3300 | 15 | 0.555 |
| | Polyester LS Code 6 3025-LS | 45 | 1.665 |

| Furnish | Fibers | % of Furnish | Weight (g) |
|---|---|---|---|
| Example 4 | Evanite 710 | 40 | 1.48 |
| | Unitika 3300 | 17.5 | 0.6475 |
| | Polyester LS Code 6 3025-LS | 42.5 | 1.5725 |

| Furnish | Fibers | % of Furnish | Weight (g) |
|---|---|---|---|
| Example 5 | Evanite 710 | 40 | 1.48 |
| | Unitika 3300 | 20 | 0.74 |
| | Polyester LS Code 6 3025-LS | 40 | 1.48 |

| Furnish | Fibers | % of Furnish | Weight (g) |
|---|---|---|---|
| Example 6 | Evanite 710 | 40 | 1.48 |
| | Polyester LS Code 6 3025-LS | 60 | 2.22 |

| Furnish | Fibers | % of Furnish | Weight (g) |
|---|---|---|---|
| Example 7 | Evanite 710 | 40 | 1.48 |
| | Teijin TJ04CN | 17.5 | 0.6475 |
| | Polyester LS Code 6 3025-LS | 42.5 | 1.5725 |

| Furnish | Fibers | % of Furnish | Weight (g) |
|---|---|---|---|
| Example 8 | Evanite 710 | 40 | 1.48 |
| | Unitika 3380 | 17.5 | 0.6475 |
| | Polyester LS Code 6 3025-LS | 42.5 | 1.5725 |

The handsheet procedure includes an initial weigh out of the individual fibers. About six drops of Emerhurst 2348 was placed into a 100 mls. of water and set aside. About 2 gallons of cold clean tap water was placed into a 5 gallon container with 3 mls. of the Emerhurst solution and mixed. The synthetic fibers were added and allowed to mix for at least 5 minutes before adding additional fibers. Fill the Waring blender with water ½ to ¾ full, add 3 mls. of 70% sulfuric acid. Add the glass fibers. Mix on the slowest speed for 30 seconds. Add to the synthetic fibers in the pail. Mix for an additional 5 minutes. Add the binder fibers to the container. Clean and rinse the dropbox out prior to using. Insert handsheet screen and fill to the first stop. Remove air trapped under the screen by jerking up on the plunger. Add the furnish to the dropbox, mix with the plunger, and drain. Vacuum of the handsheet with the vacuum slot. If no pressing is required, remove the handsheet from the screen and dry at 250.

Pressed Handsheets at 100 Psi

Below are the physical data of the pressed handsheets that were made during Sep. 1, 2005 to Sep. 14, 2005 based on the above furnish formulations. The handsheets were pressed at 100 psi.

| Sample ID | Example 1 | Example 2 #1 | Example 2 #2 | Example 3 #1 |
|---|---|---|---|---|
| BW (g) (8 × 8 sample) | 3.52 | 3.55 | 3.58 | 3.55 |
| Thickness (inch) | 0.019 | 0.022 | 0.023 | 0.022 |
| Perm (cfm) | 51.1 | 93.4 | 90.3 | 85.8 |
| Internal Bond | 56.5 | 25.8 | 26.4 | 39 |

| Sample ID | Example 3 #2 | Example 4 #1 | Example 4 #2 | Example 5 #1 |
|---|---|---|---|---|
| BW (g) (8 × 8 sample) | 3.54 | 3.41 | 3.45 | 3.6 |
| Thickness (inch) | 0.02 | 0.017 | 0.018 | 0.022 |
| Perm (cfm) | 81.3 | 59.4 | 64.1 | 93.1 |
| Internal Bond | 46.2 | 40.6 | 48.3 | 42.2 |

| Sample ID | Example 5 #2 | Example 6 #1 | Example 6 #2 | Example 7 #1 |
|---|---|---|---|---|
| BW (g) (8 × 8 sample) | 3.51 | 3.56 | 3.56 | 3.63 |
| Thickness (inch) | 0.021 | 0.021 | 0.02 | 0.021 |
| Perm (cfm) | 89.4 | 109.8 | 108.3 | 78.9 |
| Internal Bond | 49.4 | 3.67 | No Value | 28.2 |

| Sample ID | Example 7 #2 | Example 8 #1 | Example 8 #2 |
|---|---|---|---|
| BW (g) (8 × 8 sample) | 3.54 | 3.41 | 3.45 |
| Thickness (inch) | 0.02 | 0.017 | 0.018 |
| Perm (cfm) | 81.3 | 59.4 | 64.1 |
| Internal Bond | 46.2 | 40.6 | 48.3 |

Handsheet without having Unitika 3300 were made. Results from Examples 6 #1 and 6 #2 showed that the handsheets without having Unitika 3300 had poor internal bond strengths.

The internal bond data show that the bond strengths will be at optimum with the presence of 15%-20% of Unitika 3300 in the furnish.

Results from Examples 4 #1, 4 #2, 7 #1, 7 #2, 8 #1, and 8 #2 show that Unitika 3300 works better than Teijin TJ04CN and Unitika 3380 in creating internal bond strengths in the handsheets.

| | Useful | Preferred | More Preferred |
|---|---|---|---|
| Basis Wt. (g) (8" × 8" sample) | 3 to 4 | 3.2 to 3.6 | 3.3 to 3.3 |
| Thickness (in) | 0.02 | 0.017 | 0.018 |
| Perm (cfm) | 81.3 | 59.4 | 64.1 |
| Internal Bond | 46.2 | 40.6 | 48.3 |

Unpressed Handsheets

Two handsheet Samples 4 #3 and 4 #4 were made without pressed. After being dried in the photodrier; the samples were put in the oven for 5 minutes at 300° F.

| Sample ID | Example 4 #3 | Example 4 #4 |
|---|---|---|
| BW (g) (8" × 8" sample) | 3.53 | 3.58 |
| Thickness (inch) | 0.029 | 0.03 |
| Perm (cfm) | 119.8 | 115.3 |
| Internal Bond | 17.8 | 19.8 |

Compared to Samples 4 #1 and 4 #2 (pressed handsheet), the unpressed samples 4 #3 and 4 #4 were having much lower internal bond strengths.

Pressed Handsheets at 50 Psi

Two handsheet Samples 4 #5 and 4 #6 were made and pressed at 50 psi. Below are the physical properties of the handsheets.

| Sample ID | Example 4 #5 | Example 4 #6 |
|---|---|---|
| BW (g) (8" × 8" sample) | 3.63 | 3.65 |
| Thickness (inch) | 0.024 | 0.023 |
| Perm (cfm) | 91.4 | 85.8 |
| Internal Bond | 33.5 | 46 |

Results of Examples 4 #1-4 #6 show that binders are more effective with pressing.

Pressed and Saturated Handsheets

Two handsheet Examples 4 #7 and 6 #3 were made. First, the handsheets were dried in the photodrier; then were saturated in the solution of 95% Rhoplex TR-407 (Rohm & Haas) and 5% Cymel 481 (Cytec) on dry resin basis. Then the handsheets were pressed at 100 psi and tested. Below are the physical properties of the saturated handsheets. Results show that the resin solution may decrease the internal bond strengths

| Sample ID | Example 4 #7 | Example 6 #3 |
|---|---|---|
| BW (g) (8" × 8" sample) | 3.57 | 3.65 |
| Final BW (g) (8" × 8" sample) | 4.43 | 4.62 |
| Pick-up percent (%) | 24.1 | 26.6 |
| Thickness (inch) | 0.019 | 0.022 |
| Perm (cfm) | 64.9 | 67.4 |
| Internal Bond | 32.3 | No Value |

Results show that the Teijin TJ04CN, Unitika 3380 and Unitika 3300 binder fibers would improve internal bond strengths in the synthetic media and Unitika 3300 works best among the binder fibers. Handsheets without having Unitika 3300 had poor internal bond strengths. Handsheets were having optimum bond strengths with the presence of 15%-20% of Unitika 3300 in the furnish. Pressed handsheets were having higher internal bond strengths than unpressed handsheets. The latex resin does not provide internal bond strengths to polyester fibers. Latex resin may be used in conjunction with the binder fibers but the binder fibers would yield more effective internal bond strengths without latex resin.

The sheet media of the invention are typically made using papermaking processes. Such wet laid processes are particularly useful and many of the fiber components are designed for aqueous dispersion processing. However, the media of the invention can be made by air laid processes that use similar components adapted for air laid processing. The machines used in wet laid sheet making include hand laid sheet equipment, Fourdrinier papermaking machines, cylindrical papermaking machines, inclined papermaking machines, combination papermaking machines and other machines that can take a properly mixed paper, form a layer or layers of the furnish components, remove the fluid aqueous components to form a wet sheet. A fiber slurry containing the materials are typically mixed to form a relatively uniform fiber slurry. The fiber slurry is then subjected to a wet laid papermaking process. Once the slurry is formed into a wet laid sheet, the wet laid sheet can then be dried, cured or otherwise processed to form a dry permeable, but real sheet, media, or filter. Once sufficiently dried and processed to filtration media, the sheets are typically about 0.25 to 1.9 millimeter in thickness, having a basis weight of about 20 to 200 or 30 to 150 g-m$^{-2}$. For a commercial scale process, the bicomponent mats of the invention are generally processed through the use of papermaking-type machines such as commercially available Fourdrinier, wire cylinder, Stevens Former, Roto Former, Inver Former, Venti Former, and inclined Delta Former machines. Preferably, an inclined Delta Former machine is utilized. A bicomponent mat of the invention can be prepared by forming pulp and glass fiber slurries and combining the slurries in mixing tanks, for example. The amount of water used in the process may vary depending upon the size of the equipment used. The furnish may be passed into a conventional head box where it is dewatered and deposited onto a moving wire screen where it is dewatered by suction or vacuum to form a non-woven bicomponent web. The web can then be coated with a binder by conventional means, e.g., by a flood and extract method and passed through a drying section which dries the mat and cures the binder, and thermally bonds the sheet, media, or filter. The resulting mat may be collected in a large roll.

The medium or media can be formed into substantially planar sheets or formed into a variety of geometric shapes using forms to hold the wet composition during thermal bonding. The media fiber of the invention includes glass, metal, silica, polymer and other related fibers. In forming shaped media, each layer or filter is formed by dispersing fibers in an aqueous system, and forming the filter on a mandrel with the aid of a vacuum. The formed structure is then dried and bonded in an oven. By using a slurry to form the filter, this process provides the flexibility to form several structures; such as, tubular, conical, and oval cylinders.

Certain preferred arrangements according to the present invention include filter media as generally defined, in an overall filter construction. Some preferred arrangements for such use comprise the media arranged in a cylindrical, pleated configuration with the pleats extending generally longitudinally, i.e. in the same direction as a longitudinal axis of the cylindrical pattern. For such arrangements, the media may be imbedded in end caps, as with conventional filters. Such arrangements may include upstream liners and downstream liners if desired, for typical conventional purposes. Permeability relates to the quantity of air (ft$^3$-min$^{-1}$-ft$^{-2}$ or ft-min$^{-1}$) that will flow through a filter medium at a pressure drop of 0.5 inches of water. In general, permeability, as the term is used is assessed by the Frazier Permeability Test according to ASTM D737 using a Frazier Permeability Tester available from Frazier Precision Instrument Co. Inc., Gaithersburg, Md. or a TexTest 3300 or TexTest 3310 available from TexTest 3300 or TexTest 3310 available from Advanced Testing Instruments Corp (ATI), 243 East Black Stock Rd. Suite 2, Spartanburg, S.C. 29301, (864)989-0566, www.aticorporation.com. Pore size referred to in this disclosure means mean flow pore diameter determined using a capillary flow porometer instrument like Model APP 1200 AEXSC sold by Porus Materials, Inc., Cornell University Research Park, Bldg. 4.83 Brown Road, Ithaca, new York 14850-1298, 1-800-825-5764, www.pmi-app.com.

Preferred crankcase ventilation filters of the type characterized herein include at least one media stage comprising wet laid media. The wet laid media is formed in a sheet form using wet laid processing, and is then positioned on/in the filter cartridge. Typically the wet laid media sheet is at least used as a media stage stacked, wrapped or coiled, usually in multiple layers, for example in a tubular form, in a serviceable cartridge. In use, the serviceable cartridge would be positioned with the media stage oriented for convenient drainage vertically. For example, if the media is in a tubular form, the media would typically be oriented with a central longitudinal axis extending generally vertically.

As indicated, multiple layers, from multiple wrappings or coiling, can be used. A gradient can be provided in a media stage, by first applying one or more layers of wet laid media of first type and then applying one or more layers of a media (typically a wet laid media) of a different, second, type. Typically when a gradient is provided, the gradient involves use of two media types which are selected for differences in efficiency. This is discussed further below.

Herein, it is important to distinguish between the definition of the media sheet used to form the media stage, and the definitions of the overall media stage itself. Herein the term "wet laid sheet," "media sheet" or variants thereof, is used to refer to the sheet material that is used to form the media stage in a filter, as opposed to the overall definition of the total media stage in the filter. This will be apparent from certain of the following descriptions.

Secondly, it is important to understand that a media stage can be primarily for coalescing/drainage, for both coalescing/drainage and particulate filtration, or primarily for particulate filtration. Media stages of the type of primary concern herein, are at least used for coalescing/drainage, although they typically also have particulate removal function and may comprise a portion of an overall media stage that provides for both coalescing/drainage and desired efficiency of solid particulate removal.

In the example arrangement described above, an optional first stage and a second stage were described in the depicted arrangements. Wet laid media according to the present descriptions can be utilized in either stage. However typically the media would be utilized in a stage which forms, in the arrangements shown, the tubular media stages. In some instances when materials according to the present disclosure are used, the first stage of media, characterized as the optional first stage hereinabove in connection with the figures, can be avoided entirely, to advantage.

The media composition of the wet laid sheets used to form a stage in a filter is provided in a form having a calculated pore size (X-Y direction) of at least 10 micron, usually at least 12 micron. The pore size is typically no greater than 60 micron, for example within the range of 12-50 micron, typically 15-45 micron. The media is formulated to have a DOP % efficiency (at 10.5 fpm for 0.3 micron particles), within the range of 3-18%, typically 5-15%. The media can comprise at least 30% by weight, typically at least 40% by weight, often at least 45% by weight and usually within the range of 45-70% by weight, based on total weight of filter material within the sheet, bi-component fiber material in accord with the general description provided herein. The media comprises 30 to 70% (typically 30-55%), by weight, based on total weight of fiber material within the sheet, of secondary fiber material having average largest cross-sectional dimensions (average diameters is round) of at least 1 micron, for example within the range of 1 to 20 micron. In some instances it will be 8-15 micron. The average lengths are typically 1 to 20 mm, often 1-10 mm, as defined. This secondary fiber material can be a mix of fibers. Typically polyester and/or glass fibers are used, although alternatives are possible. Typically and preferably the fiber sheet (and resulting media stage) includes no added binder other than the binder material contained within the bi-component fibers. If an added resin or binder is present, preferably it is present at no more than about 7% by weight of the total fiber weight, and more preferably no more than 3% by weight of the total fiber weight. Typically and preferably the wet laid media is made to a basis weight of at least 20 lbs. per 3,000 square feet (9 kg/278.7 sq. m.), and typically not more than 120 lbs. per 3,000 square feet (54.5 kg/278.7 sq. m.). Usually it will be selected within the range of 40-100 lbs. per 3,000 sq. ft. (18 kg-45.4 kg/278.7 sq. m). Typically and preferably the wet laid media is made to a Frazier permeability (feet per minute) of 40-500 feet per minute (12-153 meters/min.), typically 100 feet per minute (30 meters/min.). For the basis weights on the order of about 40 lbs/3,000 square feet-100 lbs./3,000 square feet (18-45.4 kg/278.7 sq. meters), typical permeabilities would be about 200-400 feet per minute (60-120 meters/min.). The thickness of the wet laid media sheet(s) used to later form the described media stage in the filter at 0.125 psi (8.6 millibars) will typically be at least 0.01 inches (0.25 mm) often on the order of about 0.018 inch to 0.06 inch (0.45-1.53 mm); typically 0.018-0.03 inch (0.45-0.76 mm).

Media in accord with the general definitions provided herein, including a mix of bi-component fiber and other fiber, can be used as any media stage in a filter as generally described above in connection with the figures. Typically and preferably it will be utilized to form the tubular stage. When used in this manner, it will typically be wrapped around a center core of the filter structure, in multiple layers, for example often at least 20 layers, and typically 20-70 layers, although alternatives are possible. Typically the total depth of the wrapping will be about 0.25-2 inches (6-51 mm), usually 0.5-1.5 (12.7-38.1 mm) inches depending on the overall efficiency desired. The overall efficiency can be calculated based upon the number of layers and the efficiency of each layer. For example the efficiency at 10.5 feet per minute (3.2 m/min) for 0.3 micron DOP particles for media stage comprising two layers of wet laid media each having an efficiency of 12% would be 22.6%, i.e., 12%+ 0.12×88.

Typically enough media sheets would be used in the final media stage to provide the media stage with overall efficiency measured in this way of at least 85%, typically 90% or greater. In some instances it would be preferred to have the efficiency at 95% or more. In the context the term "final media stage" refers to a stage resulting from wraps or coils of the sheet(s) of wet laid media.

In crankcase ventilation filters, a calculated pore size within the range of 12 to 80 micron is generally useful. Typically the pore size is within the range of 15 to 45 micron. Often the portion of the media which first receives gas flow with entrained liquid for designs characterized in the drawings, the portion adjacent the inner surface of tubular media construction, through a depth of at least 0.25 inch (6.4 mm), has an average pore size of at least 20 microns. This is because in this region, a larger first percentage of the coalescing/drainage will occur. In outer layers, in which less coalescing drainage occur, a smaller pore size for more efficient filtering of solid particles, may be desirable in some instances. The term X-Y pore size and variants thereof when used herein, is meant to refer to the theoretical distance between fibers in a filtration media. X-Y refers to the surface direction versus the Z direction which is the media thickness. The calculation assumes that all the fibers in the media are lined parallel to the surface of the media, equally spaced, and ordered as a square when viewed in cross-section perpendicular to the length of the fibers. The X-Y pore size is a distance between the fiber surface on the opposite corners of the square. If the media is composed of fibers of various diameters, the $d^2$ mean of the fiber is used as the diameter. The $d^2$ mean is the square root of the average of the diameters squared. It has been found that it is useful to have calculated pore sizes on the higher end of the preferred range, typically 30 to 50 micron, when the media stage at issue has a total vertical height, in the crankcase ventilation filter of less than 7 inches (178 mm); and, pore sizes on the smaller end, about 15 to 30 micron, are sometimes useful when the filter cartridge has a height on the larger end, typically 7-12 inches (178-305 mm). A reason for this is that taller filter stages provide for a higher liquid head, during coalescing, which can force coalesced liquid flow, under gravity, downwardly through smaller pores, during drainage. The smaller pores, of course, allow for higher efficiency and fewer layers. Of course in a typical operation in which the same media stage is being constructed for use in a variety of filter sizes, typically for at least a portion of the wet laid media used for the coalescing/drainage in initial separation, an average pore size of about 30-50 microns will be useful.

Solidity is the volume fraction of media occupied by the fibers. It is the ratio of the fibers volume per unit mass divided by the media's volume per unit mass. Typical wet laid materials preferred for use in media stages according to the present disclosure, especially as the tubular media stage in arrangements such as those described above in connection with the figures, have a percent solidity at 0.125 psi (8.6 millibars) of under 10%, and typically under 8%, for example 6-7%. The thickness of media utilized to make media packs according to the present disclosure, is typically measured using a dial comparator such as an Ames #3W (BCA Melrose MA) equipped with a round pressure foot, one square inch. A total of 2 ounces (56.7 g) of weight is applied across the pressure foot. Typical wet laid media sheets useable to be wrapped or stacked to form media arrangements according to the present disclosure, have a thickness of at least 0.01 inches (0.25 mm) at 0.125 psi (8.6 millibars), up to about 0.06 inches (1.53 mm), again at 0.125 psi (8.6 millibars). Usually, the thickness will be 0.018-0.03 inch (0.44-0.76 mm) under similar conditions.

Compressibility is a comparison of two thickness measurements made using the dial comparator, with compressibility being the relative loss of thickness from a 2 ounce (56.7 g) to a 9 ounce (255.2 g) total weight (0.125 psi-0.563 psi or 8.6 millibars-38.8 millibars). Typical wet laid media (at about 40 lbs/3,000 square feet (18 kg/278.7 sq. m) basis weight) useable in wrappings according to the present disclosure, exhibit a compressibility (percent change from 0.125 psi to 0.563 psi or 8.6 millibars-38.8 millibars) of no greater than 25%, and typically 12-16%.

The media of the invention have a preferred DOP efficiency at 10.5 ft/minute for 0.3 micron particles for layers or sheets of wet laid media. This requirement indicates that a number of layers of the wet laid media will typically be required, in order to generate an overall desirable efficiency for the media stage of typically at least 85% or often 90% or greater, in some instances 95% or greater. In general, DOP efficiency is a fractional efficiency of a 0.3 micron DOP particle (dioctyl phthalate) challenging the media at 10 fpm. A TSI model 3160 Bench (TSI Incorporated, St. Paul, Minn.) can be used to evaluate this property. Model dispersed particles of DOP are sized and neutralized prior to challenging the media. The wet laid filtration media accomplishes strength through utilization of added binders. However this compromises the efficiency and permeability, and increases solidity. Thus, as indicated above, the wet laid media sheets and stages according to preferred definitions herein typically include no added binders, or if binder is present it is at a level of no greater than 7% of total fiber weight, typically no greater than 3% of total fiber weight. Four strength properties generally define media gradings: stiffness, tensile, resistance to compression and tensile after fold. In general, utilization of bi-component fibers and avoidance of polymeric binders leads to a lower stiffness with a given or similar resistance to compression and also to good tensile and tensile after fold. Tensile strength after folding is important, for media handling and preparation of filter cartridges of the type used in many crankcase ventilation filters. Machine direction tensile is the breaking strength of a thin strip of media evaluated in the machine direction (MD). Reference is to Tappi 494. Machine direction tensile after fold is conducted after folding a sample 180° relative to the machine direction. Tensile is a function of test conditions as follows: sample width, 1 inch (25.4 mm); sample length, 4 inch gap (101.6 mm); fold—1 inch (25.4 mm) wide sample 180° over a 0.125 inch (3.2 mm) diameter rod, remove the rod and place a 10 lb. weight (4.54 kg) on the sample for 5 minutes. Evaluate tensile; pull rate—2 inches/minute (50.8 mm/minute).

Example 9

Example 9, EX1051, is a sheet material useable for example, as a media phase in a filter and can be used in layers to provide useable efficiencies of overall filtration. The material will drain well and effectively, for example when used as a tubular media construction having a height of 4 inches-12 inches (100-300.5 mm). The media can be provided in multiple wrappings, to generate such a media pack. The media comprises a wet laid sheet made from a fiber mix as follows: 50% by wt. DuPont polyester bi-component 271P cut to 6 mm length; 40% by wt. DuPont polyester 205 WSD, cut to 6 mm length; and 10% by wt. Owens Corning DS-9501-11W Advantex glass fibers, cut to 6 mm. The DuPont 271P bi-component fiber is an average fiber diameter of about 14 microns. The DuPont polyester 205 WSD fiber has an average fiber diameter of about 12.4 microns. The Owens Corning DS-9501-11W has an average fiber diameter of about 11 microns. The material was made to a basis weight of about 40.4 lbs./3,000 sq. ft. The material had a thickness at 0.125 psi, of 0.027 inches and at 0.563 psi of 0.023 inches. Thus, the total percent change (compressibility) from 0.125 to 0.563 psi, was only 14%. At 1.5 psi, the thickness of the material was 0.021 inches. The solidity of the material at 0.125 psi was 6.7%. The permeability (frazier) was 392 feet per minute. The MD fold tensile was 2.6 lbs./inch width. The calculated pore size, X-Y direction, was 43 microns. The DOP efficiency of 10.5 feet per minute per 0.43 micron particles, was 6%.

Example 10

Example 10, EX1050, was made from a fiber mixture comprising 50% by weight DuPont polyester bi-component 271P cut to 6 mm length; and 50% by weight Lauscha B50R microfiber glass. The microfiber glass had lengths on the order of about 3-6 mm. Again, the DuPont polyester bi-component 271P had an average diameter of 14 microns. The Lauscha B50R had an average diameter of 1.6 microns and a $d^2$ mean of 2.6 microns.

The sample was made to a basis weight of 38.3 lbs./3,000 square feet. The thickness of the media at 0.125 psi, 0.020 inches and at 0.563 psi was 0.017 inches. Thus the percent changed from 0.125 psi to 0.563 psi was 15%, i.e., 15% compressibility. At 1.5 psi, the sample had a thickness of 0.016 inches. The solidity of the material measured at 0.125 psi was 6.9%. The permeability of the material was about 204 feet/minute. The machine direction fold tensile was measured at 3.9 lbs/inch width. The calculated pore size X-Y direction was 18 microns. The DOP efficiency at 10.5 ft/minute for 0.3 micron particles, was 12%. The material would be effective when used as a layer or a plurality of layers to polish filtering. Because of its higher efficiency, it can be used alone or in multiple layers to generate high efficiency in the media.

Example 11

Example 11, EX 1221, is a sheet material useable for example, as a media phase in a filter and can be used in layers to provide usable efficiencies for overall filtration. The material will not drain as well as either example 9 or 10 but will exhibit much higher efficiency. It is useful for mist applications where load rate is lower and element construction allows for a pleated construction of higher pleat height, such as 10 inches. The media was made from a fiber mixture comprising 50% by weight DuPont polyester bi-component 271P cut to 6 mm length; and 12.5% by weight Lauscha B50R microfiber glass and 37.5% Lauscha B26R. The microfiber glass had lengths on the order of about 3-6 mm. Again, the DuPont polyester bi-component 271P had an average diameter of 14 microns. The Lauscha B50R had an average diameter of 1.6 microns and a $d^2$ mean of 2.6 microns.

The sample was made to a basis weight of 78.8 lbs./3,000 square feet. The thickness of the media at 0.125 psi, 0.050 inches and at 0.563 psi was 0.039 inches. Thus the percent changed from 0.125 psi to 0.563 psi was 22%, i.e., 22% compressibility. At 1.5 psi, the sample had a thickness of 0.035 inches. The solidity of the material measured at 0.125 psi was 5.6%. The permeability of the material was about 68 feet/minute. The machine direction fold tensile was measured at 6.8 lbs/inch width. The calculated pore size X-Y direction was 16 microns. The DOP efficiency at 10.5 ft/minute for 0.3 micron particles, was 26%. The material would be effective when used as a layer or a plurality of layers to polish filtering. Because of its higher efficiency, it can be used alone or in multiple layers to generate high efficiency in the media.

Increased hydrophilic modification of the surface characteristics of the fibers in media, such as increasing the contact angle, should enhance water binding and the drainage capability of the filtration media and thus the performance of a filter (reduced pressure drop and improved mass efficiency). Various fibers are used in the design of for example filtration media used for low pressure filters such as mist filters or others (less than 1 psi terminal pressure drop). One method of modifying the surface of the fibers is to apply a surface treatment such as a fluorochemical or silicone containing material, 0.001 to 5% or about 0.01 to 2% by weight of the media. We anticipate modifying the surface characteristics of the fibers in a wet laid layer that can include bicomponent fibers, other secondary fiber such as a synthetic, ceramic or metal fibers with and without additional resin binder at about 0.001 to 7% by weight when used. The resulting media would be incorporated into filter element structures with a thickness generally greater than 0.05 inches often about 0.1 to 0.25 inches. The media would have larger XY pore size than conventional air media, generally greater than 10 often about 15 to 100 micron, and would be composed of larger size fibers, generally greater than 6 micron although in certain cases small fibers could be used to enhance efficiency. The use of surface modifiers should allow the construction of media with smaller XY pore sizes than untreated media, thereby increasing efficiency with the use of small fibers, reduce the thickness of the media for more compact elements, and reduce the equilibrium pressure drop of the element.

In the case of mist filtration, the system must be designed to drain the collected liquids; otherwise element life is uneconomically short. Media in both prefilter and primary element are positioned so that the liquid can drain from the media. The primary performance properties for these two elements are: initial and equilibrium fractional efficiency, pressure drop, and drainage ability. The primary physical properties of the media are thickness, solidity, and strength.

The elements are typically aligned vertically which enhances the filter's capability to drain. In this orientation, any given media composition will exhibit a equilibrium liquid height which will be a function of the XY pore size, fiber orientation, and the interaction of the liquid with the fibers' surface, measured as contact angle. The collection of liquid in the media will increase the height to a point balanced with the drainage rate of liquid from the media. Any portion of the media that is plugged with draining liquid would not be available for filtration thus increasing pressure drop and decreasing efficiency across the filter. Thus it is advantageous to minimize the portion of the element that retains liquid.

The three media factors effecting drainage rate, XY pore size, fiber orientation, and interaction of the liquid being drained with the fiber's surface, can all be modified to minimize the portion of the media that is plugged with liquid. The XY pore size of the element can be increased to enhance the drainage capability of the media but this approach has the effect of reducing the number of fibers available for filtration and thus the efficiency of the filter. To achieve target efficiency, a relatively thick element structure may be needed, typically greater than 0.125 inches, due to the need for a relatively large XY pore size. The fibers can be oriented with the vertical direction of the media but this approach is difficult to achieve in a manufacturing scenario. The interaction of the liquid being drained with the surface of the fibers can be modified to enhance the drainage rate. This invention disclosure supports this approach.

In one application, crank case filtration applications, small oil particle mists are captured, collect in the element and eventually drain from the element back into the engine's oil sump. Filtration systems installed on the crank case breather of diesel engines can be composed of multiple elements, a pre filter that removes large particles generally greater than 5 microns and a primary filter that removes the bulk of the residual contamination. The primary element can be composed of single or multiple layers of media. The composition of each layer can be varied to optimize efficiency, pressure drop and drainage performance.

Due to filtration system size constraints, the pre and primary elements must be designed for equilibrium fractional efficiency. Equilibrium fractional efficiency is defined as the element's efficiency once the element is draining liquid at a rate equal to the collection rate. The three performance properties, initial and equilibrium fractional efficiency, pressure drop, and drainage ability, are balanced against the element's design to achieve optimum performance. Thus, as an example, short elements in a high liquid loading environment must be designed to drain at a relatively fast rate.

Filtration performance (relative low pressure drop, high efficiency and the capability to drain) coupled with space requirements necessitates short elements composed of relatively thick, open media. As an example the small Spiracle element would be a vertically positioned cylinder of filtration media with an ID of 2" and thickness of 0.81 inches. The height of the media available for filtration would be only 4.72".

Various element configurations are being evaluated. The pre filter is composed of two layers of dry laid high loft polyester media. The primary element is composed of multiple wraps of EX 1051, 42 to 64 layers dependent on the available OD dimensions. Structures such as 32 wraps of EX 1051 and 12 wraps of EX 1050 separated with expanded metal have been evaluated. Various basis weights can be used to achieve equivalent element thickness. The elements are being tested in standard engine blow-by filter housings, reverse flow (cylindrical elements with the flow from the inside-out). Modifications to the housings are anticipated to enhance oil drainage. It is also envisioned that the primary element could be an inner wrap. Other pre and primary element media configurations are anticipated such as dry laid VTF, use of other dry laid media grades utilizing bicomponent fibers or other combinations of fibers using the wet laid process.

This same approach can be used in applications where height restrictions are not as stringent but the drainage rate of the media is of primary concern. As an example, Industrial Air Filtration utilizes media collecting mist particles generated from the cooling fluids used in machine tool cutting. In this case the height of the media positioned in the vertical direction is 10 inches to greater than 30 inches. Thus a smaller XY pore size can be used but enhanced drainage will improve the performance of the element, equilibrium efficiency and pressure drop. We have evaluated a second media grade. The media grade, EX 1050, is composed of 50% by mass DuPont Polyester bicomponent 271P cut 6 mm and 50% by mass Lauscha B50R microfiber glass (see attached media physicals). Additional grades of media incorporating small microfiber glass have been evaluated.

It is anticipated that some combination of fiber size, solidity resulting in an XY pore size coupled with surface modification will yield superior performance where as a much smaller XY pore size will yield inferior performance.

The media's performance was evaluated in element form. Multiple wraps of EX 1051-40 media, approximately 42, were wound around a center core. Two layers of a pre filter, EN 0701287, a dry laid latex impregnated media composed of large polyester fibers and large pores were cut out as a circle and placed on one end of the center core. Both ends were potted and the element was positioned in a housing so that challenge air was directed through the prefilter then into the inside of the wrapped core and through the media to the outside of the cylinder.

Challenge oil, Mallinckrodt N.F. 6358 mineral oil, is created using either a Laskin and/or TSI atomizer. Both the number of nozzles and air pressure is varied to generate particles and maintain mass flow. A 2/1 mass ratio between the Laskin and TSI atomizers is produced to evaluate small and medium size CCV elements. Both nozzles are used to match expected particle distributions exhibited in diesel engine crank case ventilation.

The element evaluations were initiated at the high/high test condition without any presoaking, to model worse case field conditions. Every 24 hours of operation a mass balance is conducted to determine element efficiency. The flow and oil feed rate condition is maintained until the element has achieved equilibrium, defined when the mass of oil drained equals the mass of oil captured (>95% of equilibrium). A pressure drop/flow curve is then obtained by obtaining DP at various flows.

Under low flow and flux (2 cfm and 7.4 gm/hr/sq ft), the equilibrium pressure drop for a small size diesel engine crank case ventilation element (ID: 2 inches of water, OD: 3.62" media height 5.25") utilizing untreated EX 1051-40 media (~42 wraps of 40 lb/3,000 sq ft) was 1.9" of water. Equilibrium mass efficiency of 92.7%. A media treated with approximately 2.5% ZONYL 7040, a fluorochemical, and used to construct an equivalent element exhibited an equilibrium pressure drop of 2.7" of water but a mass efficiency of 98.8%.

Wet Laid Mist Media

| | Composition | Fiber size, average diameter | Basis Weight lb/3000 sq ft | Thickness inches, 0.125 psi | Thickness inches, 0.563 psi | Thickness inches, 1.5 psi | Compressability % change from 0.125 oz to 0.563 psi | Solidity at 0.125 psi Units % | Perm fpm | MD Fold Tensile lb/in width | Calculated Pore Size, X-Y direction microns | 3160 DOP Efficiency @ 10.5 fpm % at 0.3 um |
|---|---|---|---|---|---|---|---|---|---|---|---|---|
| Example 10, | 50% by mass DuPont Polyester bicomponent 271P cut 6 mm, 50% by mass Lauscha B50R microfiber glass | 271P: 14 microns, B50R: 1.6 microns (2.5 um $d^2$ mean) | 38.3 | 0.020 | 0.017 | 0.016 | 15 | 6.9 | 204 | 3.9 | 18 | 12.0 |
| Example 9 | 50% by mass DuPont Polyester bicomponent | 271P: 14 microns, | 40.4 | 0.027 | 0.023 | 0.021 | 14 | 6.7 | 392 | 2.6 | 43 | 6.0 |

-continued

Wet Laid Mist Media

| | Composition | Fiber size, average diameter | Basis Weight lb/3000 sq ft | Thickness inches, 0.125 psi | Thickness inches, 0.563 psi | Thickness inches, 1.5 psi | Compressability % change from 0.125 oz to 0.563 psi Units | Solidity at 0.125 psi % | Perm fpm | MD Fold Tensile lb/in width | Calculated Pore Size, X-Y direction microns | 3160 DOP Efficiency @ 10.5 fpm % at 0.3 um |
|---|---|---|---|---|---|---|---|---|---|---|---|---|
| Example 11 | 271P cut 6 mm, 40% by mass DuPont Polyester 205 WSD cut 6 mm, 10% by mass Owens Corning DS-9501-11W Advantex cut to 6 mm 50% by mass DuPont Polyester bicomponent 271P cut 6 mm, 12.5% by mass Lauscha B50R microfiber glass and 37.5% by mass Lauscha B26R | 205 WSD: 12.4 microns DS-9501-11W: 11 microns 271P: 14 microns, B50R: 1.6 microns (2.5 um d² mean) B26R: 1.5 micron (1.95) | 78.8 | 0.050 | 0.039 | 0.035 | 22 | 5.6 | 68 | 6.9 | 16 | 26.3 |
| Range Produced | | | 20 to 120 | | | | | | | | | |

In one embodiment of the invention, the filtration medium or media is comprised of a thermally bonded sheet. The sheet is comprised of about 20 to 80 wt % of a bicomponent binder fiber and about 20 to 80 wt % of a glass fiber. The bicomponent binder fiber has a diameter of about 5 to 50 micrometers and a length of about 0.1 to 15 cm. The glass fiber has a diameter of about 0.1 to 30 micrometers and an aspect ratio of about 10 to 10,000. The media has a thickness of about 0.2 to 50 mm, a solidity of about 2 to 25%, a basis weight of about 10 to 1000 g-m-2, a pore size of about 0.5 to 100 micrometers and a permeability of about 5 to 500 ft-min-1. The media is comprised of about 0.1 to 10 wt % of a binder resin. The media is comprised of about 0.5 to 15 wt % of a secondary fiber. One example of the secondary fiber would be a glass fiber wherein the glass fiber is selected from one or two or more sources of glass fiber where the average diameter of the glass fiber is of about 0.1 to 1 micrometers, 0.3 to 2 micrometers, 0.5 to 5 micrometers, 0.75 to 7 micrometers, 1 to 10 micrometers, or 3 to 30 micrometers. The media is comprised of a single layer or two or more layers. The media is comprised of about 0.01 to 10 wt % of a fluoro-organic agent.

In one embodiment of the invention, the invention is a liquid filtration medium comprised of a thermally bonded sheet. The thermally bonded sheet is comprised of about 10 to 90 wt % of a bicomponent binder fiber and about 10 to 90 wt % of a media fiber. The bicomponent binder fiber has a diameter of about 5 to 50 micrometers and a length of about 0.1 to 15 cm. The media fiber has a diameter of about 0.1 to 5 micrometers and an aspect ratio of about 10 to 10,000. The media has a thickness of about 0.1 to 2 mm, a solidity of about 2 to 25%, a basis weight of about 2 to 200 g-m-2, a pore size of about 0.2 to 50 micrometers and a permeability of about 2 to 200 ft-min-1. The media fiber is comprised of a secondary fiber. The media fiber is comprised of a glass fiber. The glass fiber is selected from one or two or more sources of glass fiber where the average diameter of the glass fiber is of about 0.1 to 1 micrometers, 0.3 to 2 micrometers, 0.5 to 5 micrometers, 0.75 to 7 micrometers, 1 to 10 micrometers, or 10 to 50 micrometers. The media is comprised of about 0.1 to 25 wt % of a binder resin. The media is comprised of a single layer or two or more layers. The media is comprised of about 0.01 to 10 wt % of a fluoro-organic agent.

A method of the invention embodies filtering a liquid stream, where the method is comprised of placing a filter unit into the stream and retaining particulate entrained in the filter in the stream using filter media within the filter unit. The filter media is comprised of a thermally bonded sheet. The thermally bonded sheet is comprised of about 10 to 90 wt % of a bicomponent binder fiber and about 10 to 90 wt % of a media fiber. The bicomponent binder fiber has a diameter of about 5 to 50 micrometers and a length of about 0.1 to 15 cm. The media fiber has a diameter of about 0.1 to 5 micrometers and an aspect ratio of about 10 to 10,000. The media has a thickness of about 0.1 to 2 mm, a solidity of about 2 to 25%, a basis weight of about 2 to 200 g-m-2, a pore size of about 0.2 to 50 micrometers and a permeability of about 2 to 200 ft-min-1. The liquid to be filtered may be either an aqueous liquid or a non-aqueous liquid. The media is comprised of about 0.1 to 25 wt % of a binder resin. The media is comprised of a single layer or two or more layers. The media is comprised of about 0.01 to 10 wt % of a fluoro-organic agent.

In one embodiment of the invention, the invention is a gaseous filtration medium for removing mist from air comprising a thermally bonded sheet. The thermally bonded sheet is comprised of about 20 to 80 wt % of a bicomponent binder fiber and about 20 to 80 wt % of a media fiber. The bicomponent binder fiber has a diameter of about 5 to 50 micrometers and a fiber length of about 0.1 to 15 cm. The media fiber has a fiber diameter of about 0.1 to 20 micrometers and an aspect ratio of about 10 to 10,000. The media has a thickness of about 0.1 to 2 mm, a solidity of about 2 to 25%, a basis weight of about 20 to 100 grams-m-2, a pore size of about 5 to 20 micrometers, an efficiency of 5 to 25% at 10.5 fpm, and a permeability of about 5 to 500 ft-min-1. The media comprises about 0.1 to 10 wt % of a secondary fiber having a fiber diameter of 0.1 to 15 microns. One example of the media fiber is a glass fiber. The glass fiber is selected from one or two or more sources of glass fiber where the average diameter of the glass fiber is of about 0.1 to 1 micrometer, 0.3 to 2 micrometers, 0.5 to 5 micrometers, 0.75 to 7 micrometers, 1 to 10 micrometers, or 10 to 50 micrometers. The media is comprised of a single layer or two or more layers. The media is comprised of about 0.01 to 10 wt % of a fluoro-organic agent.

In one embodiment of the invention, the invention is a gaseous filtration medium for removing particulate from air comprising a thermally bonded sheet. The thermally bonded sheet is comprised of about 80 to 98 wt % of a bicomponent binder fiber and about 2 to 20 wt % of a media fiber. The bicomponent binder fiber has a diameter of about 10 to 15 micrometers and a fiber length of about 0.1 to 15 cm. The media fiber has a fiber diameter of about 0.1 to 5 micrometers and an aspect ratio of about 10 to 10,000. The media has a thickness of about 0.1 to 2 mm, a solidity of about 10 to 25%, a basis weight of about 40 to 400 grams-m-2, a pore size of about 10 to 30 micrometers and a permeability of about 20 to 200 ft-min-1. The media comprises a secondary fiber. One example of the media fiber is a glass fiber. The glass fiber is selected from one or two or more sources of glass fiber where the average diameter of the glass fiber is of about 0.1 to 1 micrometers, 0.3 to 2 micrometers, 0.5 to 5 micrometers, 0.75 to 7 micrometers, 1 to 10 micrometers, or 10 to 50 micrometers. The media is comprised of a single layer or two or more layers. The media is comprised of about 0.01 to 10 wt % of a fluoro-organic agent.

In one embodiment of the invention, the invention is a gaseous filtration medium for removing entrained liquid from blow comprising a thermally bonded sheet. The thermally bonded sheet is comprised of about 20 to 80 wt % of a bicomponent binder fiber and about 0.5 to 15 wt % of a media fiber or a secondary fiber. The bicomponent binder fiber has a diameter of about 5 to 15 micrometers and a fiber length of about 5 to 15 cm. The media fiber has a fiber diameter of about 0.5 to 15 micrometers and an aspect ratio of about 10 to 10,000. The media has a thickness of about 0.1 to 2 mm, a solidity of about 1 to 10%, a basis weight of about 20 to 80 grams-m-2, a pore size of about 5 to 50 micrometers, and a permeability of about 50 to 500 ft-min-1. The media comprises a secondary fiber. One example of the media fiber is a glass fiber. The glass fiber is selected from one or two or more sources of glass fiber where the average diameter of the glass fiber is of about 0.1 to 1 micrometers, 0.3 to 2 micrometers, 0.5 to 5 micrometers, 0.75 to 7 micrometers, 1 to 10 micrometers, or 10 to 50 micrometers. The media is comprised of a single layer or two or more layers. The media is comprised of about 0.01 to 10 wt % of a fluoro-organic agent.

In one embodiment of the invention, the invention is a filtration medium for filtering lubricant oil comprising a thermally bonded sheet. The sheet is comprised of about 1 to 40 wt % of a biocomponent binder fiber and about 60 to 99 wt % of a glass fiber. The bicomponent binder fiber has a diameter of about 5 to 15 micrometers and a length of about 0.1 to 15 cm. The glass fiber has a diameter of about 0.1 to 5 micrometers and an aspect ratio of about 10 to 10,000. The media has a thickness of about 0.2 to 2 mm, a solidity of about 2 to 10%, a basis weight of about 10 to 50 g-m-2, a pore size of about 0.5 to 10 micrometers and a permeability of about 0.1 to 30 ft-min-1. The media is comprised of a binder resin. One example of the media fiber would be a glass fiber wherein the glass fiber is selected from one or two or more sources of glass fiber where the average diameter of the glass fiber is of about 0.1 to 1 micrometers, 0.3 to 2 micrometers, 0.5 to 5 micrometers, 0.75 to 7 micrometers, 1 to 10 micrometers, or 3 to 30 micrometers. The media is comprised of a single layer or two or more layers. The media is comprised of about 0.01 to 10 wt % of a fluoro-organic agent.

In one embodiment of the invention, the invention is a filtration medium for filtering hydraulic oil comprising a thermally bonded sheet. The sheet is comprised of about 20 to 80 wt % of a bicomponent binder fiber and about 80 to 20 wt % of a glass fiber. The bicomponent binder fiber has a diameter of about 5 to 15 micrometers and a length of about 0.1 to 15 cm. The glass fiber has a diameter of about 0.1 to 2 micrometers and an aspect ratio of about 10 to 10,000. The media has a thickness of about 0.2 to 2 mm, a basis weight of about 40 to 350 g-m-2, a pore size of about 0.5 to 30 micrometers and a permeability of about 5 to 200 ft-min-1. The media is comprised of a binder resin. One example of the media fiber would be a glass fiber wherein the glass fiber is selected from one or two or more sources of glass fiber where the average diameter of the glass fiber is of about 0.1 to 1 micrometers, 0.3 to 2 micrometers, 0.5 to 5 micrometers, 0.75 to 7 micrometers, 1 to 10 micrometers, or 3 to 30 micrometers. The media is comprised of a single layer or two or more layers. The media is comprised of about 0.01 to 10 wt % of a fluoro-organic agent.

A method of the invention embodies filtering a heated fluid. The method is comprised of passing a mobile fluid phase containing a contaminant through a filter medium, the medium having a thickness of about 0.2 to 50 mm, the medium comprising a thermally bonded sheet, and removing the contaminant. The sheet is comprised of about 20 to 80 wt % of a bicomponent binder fiber and about 20 to 80 wt % of a glass fiber. The bicomponent binder fiber has a first component with a melting point and a second component with a lower melting point. The bicomponent binder fiber has a diameter of about 5 to 50 micrometers and a length of about 0.1 to 15 cm. The glass fiber has a diameter of about 0.1 to 30 micrometers and an aspect ratio of about 10 to 10,000. The media has a solidity of about 2 to 25%, a basis weight of about 10 to 1000 $g\text{-}m^{-2}$, a pore size of about 0.5 to 100 micrometers and a permeability of about 5 to 500 $ft\text{-}min^{-1}$, the mobile fluid phase having a temperature greater than the melting point of the second component. In one embodiment of the method described the fluid is a gas or liquid. In one embodiment of the method described the liquid is an aqueous liquid, fuel, lubricant oil or hydraulic fluid. In one embodiment of the method described, the contaminant is a liquid or solid.

The above described filtration medium can be utilized within a breather cap. The breather cap is operably coupled to a fluid reservoir and enables the ingression and egression of gas when fluid is removed from or added to the reservoir. The filtration medium enables the breather cap to filter solid particulate from influent gas, which refers to gas flowing from ambient air to the reservoir. The filtration medium also enables the breather cap to filter fluid mist from effluent gas, which refers to gas exiting the reservoir.

While the invention has been described in connection with specific embodiments thereof, it will be understood that it is capable of further modifications and this application is intended to cover any variations, uses, or adaptations of the invention following, in general, the principles of the invention and including such departures from the present disclosure as come with known or customary practice within the art to which the invention pertains and as may be applied to the essential features hereinbefore set forth and as follows in scope of the appended claims.

The invention claimed is:

1. A filtration medium comprising a thermally bonded sheet, the sheet comprising:
   about 20 to 80 wt % of a bicomponent binder fiber having a fiber diameter of about 5 to 50 micrometers; and
   an effective amount of glass fiber blended with the bicomponent binder fiber;
   wherein glass fiber is selected from the sources comprising an average fiber diameter of about 0.1 to 1 micrometer, 0.3 to 2 micrometers, 0.5 to 5 micrometers, 0.75 to 7 micrometers, 1 to 10 micrometers, and 3 to 30 micrometers, in a combination of two or more sources thereof, and in that said selected sources include the source which comprises an average fiber diameter of 3 to 30 micrometers, and wherein said selected sources include glass fibers having at least two different average fiber diameters.

2. The filtration media of claim 1, wherein the sheet comprises about 20 to 80 wt % of the glass fiber.

3. The filtration media of claim 1, wherein the glass fiber has an aspect ratio of about 10 to 10,000.

4. The filtration media of claim 1, wherein filtration medium has a thickness of about 0.2 to 50 mm, a solidity of about 2 to 25%, a basis weight of about 10 to 1,000 g-m$^2$, a pore size of about 0.5 to 100 micrometers, and a permeability of about 1.54 to 154 m-min$^{-1}$ (5 to 500 ft-min$^{-1}$).

5. The filtration media of claim 1, wherein filtration medium has a thickness of about 0.1 to 2 mm, a solidity of about 2 to 25%, a basis weight of about 2 to 200 g-m$^2$, a pore size of about 0.2 to 50 micrometers, and a permeability of about 0.616 to 61.6 m-min$^{-1}$ (2 to 200 ft-min$^{-1}$).

6. The filtration media of claim 1, wherein the filtration medium comprises a binder resin.

7. The filtration media of claim 1, wherein the filtration medium comprises two or more layers.

8. The filtration media of claim 1, wherein the filtration medium comprises a fluoro-organic compound.

9. The filtration media of claim 1, wherein the filtration medium further comprises secondary thermoplastic media fibers.

10. A method of using the filtration medium of claim 1 to filter a gaseous or liquid stream, the method comprising
   passing the gaseous or liquid stream comprising a contaminant through the filtration medium, and
   removing the contaminant.

* * * * *